United States Patent
Hiddema et al.

(10) Patent No.: US 11,154,045 B2
(45) Date of Patent: *Oct. 26, 2021

(54) AGRICULTURAL SPRAYER BOOM

(71) Applicant: AGCO NETHERLANDS BV, Grubbenvorst (NL)

(72) Inventors: Joris Jan Hiddema, Grubbenvorst (NL); Harm Mertens, Grubbenvorst (NL)

(73) Assignee: AGCO Netherlands B.V., Grubbenvorst (NL)

( * ) Notice: Subject to any disclaimer, the term of this patent is extended or adjusted under 35 U.S.C. 154(b) by 77 days.

This patent is subject to a terminal disclaimer.

(21) Appl. No.: 16/394,132

(22) Filed: Apr. 25, 2019

(65) Prior Publication Data
US 2019/0246620 A1 Aug. 15, 2019

Related U.S. Application Data

(63) Continuation of application No. 15/031,539, filed as application No. PCT/EP2014/072747 on Oct. 23, 2014, now Pat. No. 10,433,535.

(30) Foreign Application Priority Data

| Oct. 30, 2013 | (GB) | 1319119 |
| Oct. 30, 2013 | (GB) | 1319121 |
| Oct. 30, 2013 | (GB) | 1319125 |
| Oct. 30, 2013 | (GB) | 1319131 |

(51) Int. Cl.
*A01M 7/00* (2006.01)
*A01C 23/04* (2006.01)

(52) U.S. Cl.
CPC ........ *A01M 7/0075* (2013.01); *A01C 23/047* (2013.01); *A01M 7/0064* (2013.01); *A01M 7/0067* (2013.01); *A01M 7/0071* (2013.01)

(58) Field of Classification Search
CPC .............. A01M 7/0075; A01M 7/0071; A01M 7/0067; A01M 7/0064; A01C 23/047
See application file for complete search history.

(56) References Cited

U.S. PATENT DOCUMENTS

| 7,007,871 B2 * | 3/2006 | Parod | A01G 25/09 239/193 |
| 10,433,535 B2 * | 10/2019 | Hiddema | A01M 7/0064 |
| 2005/0279850 A1 * | 12/2005 | Stabler | A01C 3/06 239/1 |

FOREIGN PATENT DOCUMENTS

FR 2606672 A1 * 5/1988 .......... A01M 7/0042

* cited by examiner

*Primary Examiner* — Steven M Cernoch

(57) ABSTRACT

A boom for mounting to an agricultural sprayer comprises an elongate frame supporting a plurality of liquid application devices, liquid delivery means connected to the application devices, and an elongate tray attached to, and extending along, the boom. The tray is movable between a first position in which the tray extends substantially horizontally beneath one or more of the application devices to prevent material from leaking onto the ground below, and a second position in which the tray is located clear of delivery paths of the liquid application devices.

20 Claims, 15 Drawing Sheets

AGRICULTURAL SPRAYER BOOM

CROSS-REFERENCE TO RELATED APPLICATIONS

The present application is a continuation of U.S. patent application Ser. No. 15/031,539, filed Apr. 22, 2016 as a U.S. National Phase Application of International Patent Application PCT/EP2014/072747, filed Oct. 23, 2014, and published in English as WO2016/062964 A1 on May 7, 2015, which claims the benefit of and priority from United Kingdom Application numbers 1319119.2, 1319121.8, 1319125.9, and 1319131.7, all filed Oct. 30, 2013. The entire disclosures of each of the above-referenced applications are hereby incorporated by reference.

FIELD

The invention relates to agricultural sprayer booms, or boom sections, which extend in a transverse direction with respect to a normal forward direction of travel. The invention is particularly applicable to, although not limited to, the booms or boom sections of agricultural sprayers.

BACKGROUND

Agricultural sprayers are used by farmers and contractors to apply pesticides and other nutrient-containing solutions to crop fields. Sprayers can be mounted to, or towed by, a tractor or other suitable vehicle or may be self-propelled with an integrated means of propulsion and a driver's cab. The sprayer machine typically includes a storage tank for the liquid to be applied, the tank being filled as required by the operator. Alternatively, in systems which offer lower ground pressure, the sprayer machine may be semi-permanently connected by a pipe to a local (field-based) bowser wherein the applied liquid is supplied via a pipe from the bowser to the sprayer continuously as the latter is repeatedly moved across the crop field.

The liquid is applied to the field by a number of liquid application devices, typically spray nozzles, which are mounted in a spaced relationship along the length of a boom which, itself, is mounted to the sprayer vehicle. The nozzles are each connected to the storage tank by liquid delivery means comprising various pipes, valves, pumps and other plumbing. The liquid is atomized by the nozzles and applied to the crop in a jet of mist for example.

The valves are controlled to switch the flow of pesticide, for example, on and off as required. Due to imperfections in the associated seals, plumbing and the presence of residue fluid on the output side of the valves, dripping of the pesticide from the nozzles and pipework after switching off is often unavoidable. Spillage or unintended application of pesticide is at best undesirable, corrosive and wasteful, and at worst prohibited under local or regional environmental legislation.

Unwanted spillage of pesticide can be reduced by improving or renewing the valves, nozzles and plumbing, but even then prevention of dripping onto the ground below cannot be guaranteed.

Attempts have been made to at least prevent nozzle leakage drips from reaching the ground by providing a drip tray underneath a folded multi-section boom. However, this preventative measure is only effective when the boom is folded for transport.

With respect to the boom itself, the length of the boom determines the operating width of the sprayer. Driven by economies of scale, there is a growing demand for sprayer manufacturers to produce machines with longer spray booms. However, increasing the boom length significantly increases the risk of structural failure due to the increased stress placed upon the hinges and joints caused by natural vibrations and oscillations which pass from the spray vehicle along the boom. Today, boom lengths of conventional truss-style construction are approaching their physical limits with any further increase in length requiring significant strengthening of the joints, mountings and hinges between sections and along the boom.

Therefore, there is a continuing drive to investigate alternative boom constructions which can meet the demands of customers for longer booms.

In addition to seeking improvements in structural integrity of the boom, sprayer manufacturers continuously strive to reduce production costs at the same time as meeting customer demand for a wide range of different sprayer lengths. There is thus a desire to improve modularity in boom construction to reduce inventory on stock without affecting the range of products available.

BRIEF SUMMARY

It is an object of the invention to provide a boom for an agricultural sprayer which reduces or eliminates unintended pesticide application caused by drips from the plumbing or nozzles.

It is another object of the invention to provide means to prevent spillage of pesticide onto the ground below even when the boom is in an operating configuration.

It is yet another object of the invention to provide an alternative construction for an agricultural sprayer boom.

It is another object of the invention to provide an improved boom construction which can meet the aforementioned demands for longer multi-section sprayer booms.

It is yet another object of the invention, to provide a boom construction which presents better opportunities for modular construction of a wide range of different boom lengths.

It is a further object of the invention to provide a boom which is quicker and simpler to assemble on the assembly line.

In accordance with a first aspect of the invention there is provided a boom for mounting to an agricultural sprayer, the boom comprising an elongate frame supporting a plurality of liquid application devices, liquid delivery means connected to the application devices, and an elongate tray attached to, and extending along, the boom and being movable between a first position in which the tray extends substantially horizontally beneath one or more of the application devices and forms a liquid-retaining receptacle to prevent material from leaking onto the ground below, and a second position in which the tray is located clear of delivery paths of the liquid application devices.

It should be understood that the term "boom" applies also to individual boom sections of a multi-section boom of an agricultural sprayer.

The first aspect of the invention provides a drip tray which is attached to the boom itself and is, therefore, effective even when the boom is in an unfolded (operating) configuration. When closed, the drip tray collects fluid leakage thus preventing unwanted spillage onto the ground below. The drip tray is movable into an open position in which it resides clear of the applied spray path thus allowing the boom to function during operation. As soon as the spraying operation is complete, the drip tray may be closed to intercept drips from nozzles above.

The tray may comprise a lip or ridge around its periphery to retain liquid incident upon the tray when in the first position.

The tray is preferably pivotally mounted to the frame for movement around a pivot axis parallel to the elongate axis of the frame between the first position and the second position. This provides a convenient mechanism to move the drip tray between the closed and open positions.

The frame may comprises a first longitudinal member relative to the elongate axis of the frame, the tray being pivotally mounted to the first longitudinal member. The tray may be mounted to the first longitudinal member by a plurality of mutually spaced hinges.

The tray may comprise a first longitudinal edge proximate the pivot axis and a second longitudinal edge opposite the first edge, the boom further comprising latch means to secure the second edge to the frame when the tray is in the second position.

In one embodiment at least one of the application devices may be mounted to the tray.

The pivot axis is preferably disposed below the application devices.

The boom may further comprise an actuator arranged between the frame and the tray to pivot the plate between the first and second positions.

In a preferred embodiment a first tray is pivotally mounted to a front edge of the frame, and a second tray is pivotally mounted to a rear edge of the frame, each of the first and second trays being pivotally movable between a first position in which the trays extends substantially horizontally beneath one or more of the application devices, and a second position in which the trays are located clear of delivery paths of the liquid application devices.

The first and second trays may overlap when both are in their respective first positions so as to provide a better seal and prevent pesticide from leaking onto the ground. Alternatively, respective longitudinal edges of the first and second trays meet to along a sealed seam below the one or more application devices when both trays are in their respective first positions.

The tray or trays may form part of an elongate member having an elongate flexible section which flexes to allow the tray to move between the first and second positions.

The tray may comprise a double-skin structure. In this case, the tray may comprise at least one inlet and at least one vent, the inlet being in communication with a source of pressurized air when the tray is in the second position. The double-skin structure preferably defines a passage for a pressurized airstream between the inlet and the vent.

In an alternative embodiment, the tray may be slideably mounted to the frame for fore and aft translation movement between the first position and the second positions.

The tray is preferably substantially rectangular in shape.

The tray preferably comprises a concave profile for collecting liquid. Advantageously, the concave profile guides the collected fluid in a small area which assists in cleaning or draining as and when required.

The tray is preferably formed from a plastic material which is cheaper to produce and lighter.

The boom preferably comprises a frame member of hollow structural section (HSS) extending the length of the boom, wherein the application devices and liquid delivery means are mounted to the underside of the HSS. Advantageously, the structural strength of the boom, or boom section, is therefore provided by a length of HSS which extends the length of the boom. In the case of a multi-section boom, the length of HSS extends along the axis of the boom from one end of a boom section to the opposite end of the boom section.

The HSS frame member is preferable formed from an extrusion process which is significantly simpler, cheaper and quicker than manufacturing boom frames from multiple components welded, bolted or otherwise secured together.

When in the open position the tray preferably extends forwardly of the frame, with respect to the normal direction of travel. Furthermore, when in the open position the tray extends downwardly away from the frame to impact upon an airflow incident thereon as the sprayer moves across a field. Advantageously, the drip tray provides an auxiliary function when in the open position, namely the shielding of the sprayed liquid from ambient wind thus reducing drift.

The boom may further comprise means to generate, from movement of the sprayer, an airflow for accelerating the sprayed liquid downwardly. In this case, the boom further comprises first baffle means located behind and above one or more of the nozzles with respect to a forward direction of travel, and second baffle means extending forwardly of the frame and configured to funnel an airflow created by movement of the sprayer into an open section provided in a front side of the boom, the airflow being deflected downwardly by the first baffle means. The second baffle means preferably comprises the tray.

The second baffle means may further comprise an upper baffle plate extending along the front side of the boom and being mounted along one edge to the frame above the open section and extending upwardly and forwardly, to guide a further portion of the airflow into the front side of the frame. The upper baffle plate may be pivotally mounted to the frame for movement around an axis parallel to the elongate axis of the frame between a first position in which the upper baffle plate extends forwardly from the frame and a second position in which the upper baffle plate is stowed for transport against the frame.

In accordance with a second aspect of the invention there is provided a multi-section spray boom for mounting to an agricultural sprayer, the boom comprising an inner boom section for hingeably mounting to the sprayer, and at least one outer boom section hingeably connected to the inner boom section, wherein the inner boom section comprises a unitary frame member extending the length of the inner boom section and, when in use, the frame member bears the majority of bending forces exerted upon the inner boom section, the frame member having an extruded or pultruded profile.

The structural strength of the inner boom section is provided by a unitary extruded or pultruded frame member. By exploiting extrusion or pultrusion technology, single frame members can be formed which can withstand the horizontal and bending forces subjected to the boom without the need for strengthening truss members. By dispensing with the truss members, the weight of the boom is reduced thus reducing the stressed further still.

The term 'extrusion' used hereinafter should be understood to include 'pultrusion.'

Boom sections, especially inner boom sections which are mounted to the sprayer and support further boom sections, must withstand large vertical and horizontal bending forces. In known truss-based boom structures these forces are born by a plurality of lengthwise members connected by a host of struts and ties. Stress profiling and failure history shows that bending-induced stresses are focused on the nodes of truss-based structures and it is at these nodes that failures most commonly occur.

By providing a unitary extruded frame member along the length of the inner boom section, stresses caused by bending forces are instead smoothly spread along the length of the boom. Advantageously, a more robust boom construction is provided and the structural limits of truss-based boom frames are overcome allowing longer boom configurations.

To further reduce the weight and/or provide access to the inside of the frame member, holes may be cut into the sides after extrusion.

The liquid application devices and liquid delivery means are preferably mounted to the underside of the frame member. Advantageously, fitting of nozzles and associated plumbing to the underside of the frame member is more straightforward when compared to fitting inside truss-based boom structures because access to brackets and clips on the underside of the frame member, for example, is significantly better. Assembly is, therefore, much simpler and quicker. Alternatively, the liquid application devices and liquid delivery means may be mounted inside the frame member with access holes cut into the underside as required.

Furthermore, an extruded profile can be employed for boom sections of different lengths on the same assembly line. Advantageously, this facilitates improved modularity and reduces the number of components required to meet the demand of a wide range of different boom lengths.

Regarding strength and robustness, booms having an extruded frame member have been found to demonstrate a superior strength-to-weight ratio compared to known truss-based constructions.

The process of extrusion is significantly simpler, cheaper and quicker than manufacturing boom frames from multiple components welded, bolted or otherwise secured together.

The frame member is preferably formed from aluminum, giving a high strength-to-weight ratio. Alternatively, a composite material may be used such as glass fiber, carbon fiber or Kevlar, which also offer a high strength-to-weight ratio and are especially suited to forming by pultrusion.

The extruded profile may be substantially trapezium-shaped having a relatively wide bottom and tapering inwardly towards the top side. Strengthening tubes or plates may be extruded into the profile to increase rigidity.

The angles of the trapezium-shaped profile may be dictated by the desired folding angle between adjacent boom sections. In other words, the geometry of the extruded profile may affect the relative angle at which adjacent boom sections hinge with respect to one another. Alternatively, square or rectangular extruded profiles may be employed.

The boom preferably comprises a plurality of brackets secured to the underside of the frame member in a spaced relationship. These brackets preferably adopted an upside down U-shaped profile and may be formed from a pair of identical interlocking portions that interlock by means of a sliding interlock connection such as a dovetail or T-shaped interlocking connection. The bracket portions may, for example, slideably engage with one another in a direction parallel to the elongate axis of the boom. Advantageously, this allows one portion to be secured to the underside of the frame member before sliding the second portion into place.

The brackets are preferably formed from a plastics material to minimize cost and weight. However, it is envisaged that alternative materials such as steel may be utilized instead.

In accordance with preferred embodiments of the second aspect of the invention the brackets serve to mount a multitude of different components to the frame member in an easily accessible manner on the assembly line. By way of example, pipework which forms part of the liquid delivery means may be secured to the plurality of brackets by clamping or snap fitting. In one preferred arrangement each bracket presents a semi-circular shaped indentation which aligns with identical indentations provided in adjacent brackets and which work together to receive and hold linear pipework extending along the boom. Clamps may be used in conjunction with the brackets to hold the pipework in place in the indentations.

In another example one or more guard members for protecting the liquid application devices from impact with external objects may be provided and secured to the frame by the plurality of brackets. The guard member (or members) preferably comprises an elongate member that extends in a direction parallel to the elongate axis of the boom and may, for example, be formed from a simple rigid rod that resides at a similar level to the liquid application devices. In a similar manner to the pipework described above, the guard member or members may be secured to each of the plurality of brackets by a respective snap fitting or other suitable attachment means.

In a further example use of the brackets, a front and/or a rear windshield extending along the boom may be secured to the plurality of brackets, the windshield serving to reduce the effect of ambient airflow on the sprayed liquid thus minimizing drift. The windshield may alternatively be extruded into the profile of the frame member thus saving on components and cost.

BRIEF DESCRIPTION OF DRAWINGS

Further advantages will become apparent from reading the following description of specific embodiments with reference to the appended drawings in which.

DETAILED DESCRIPTION

Figure 1:
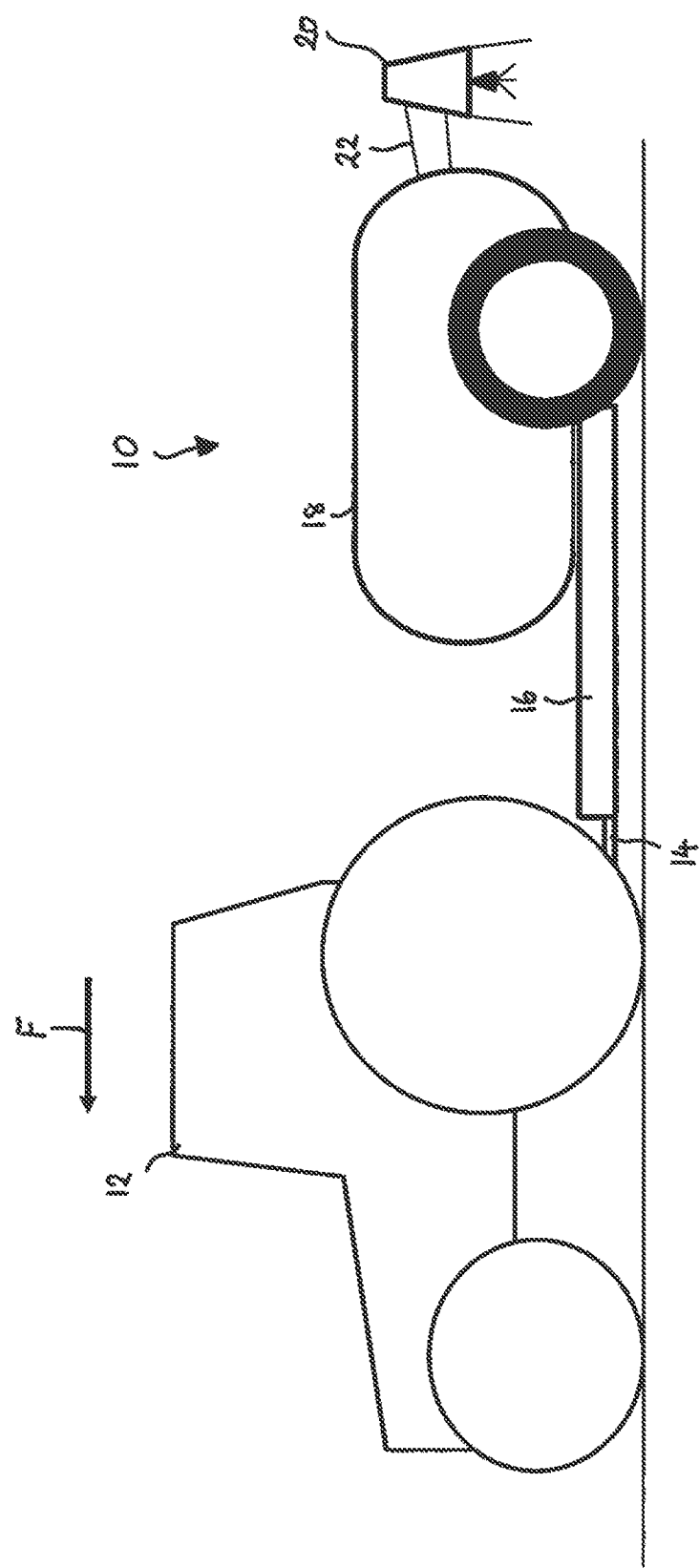
FIG. 1 is a schematic side representation of a tractor and a pull-type sprayer.
Figure 2:
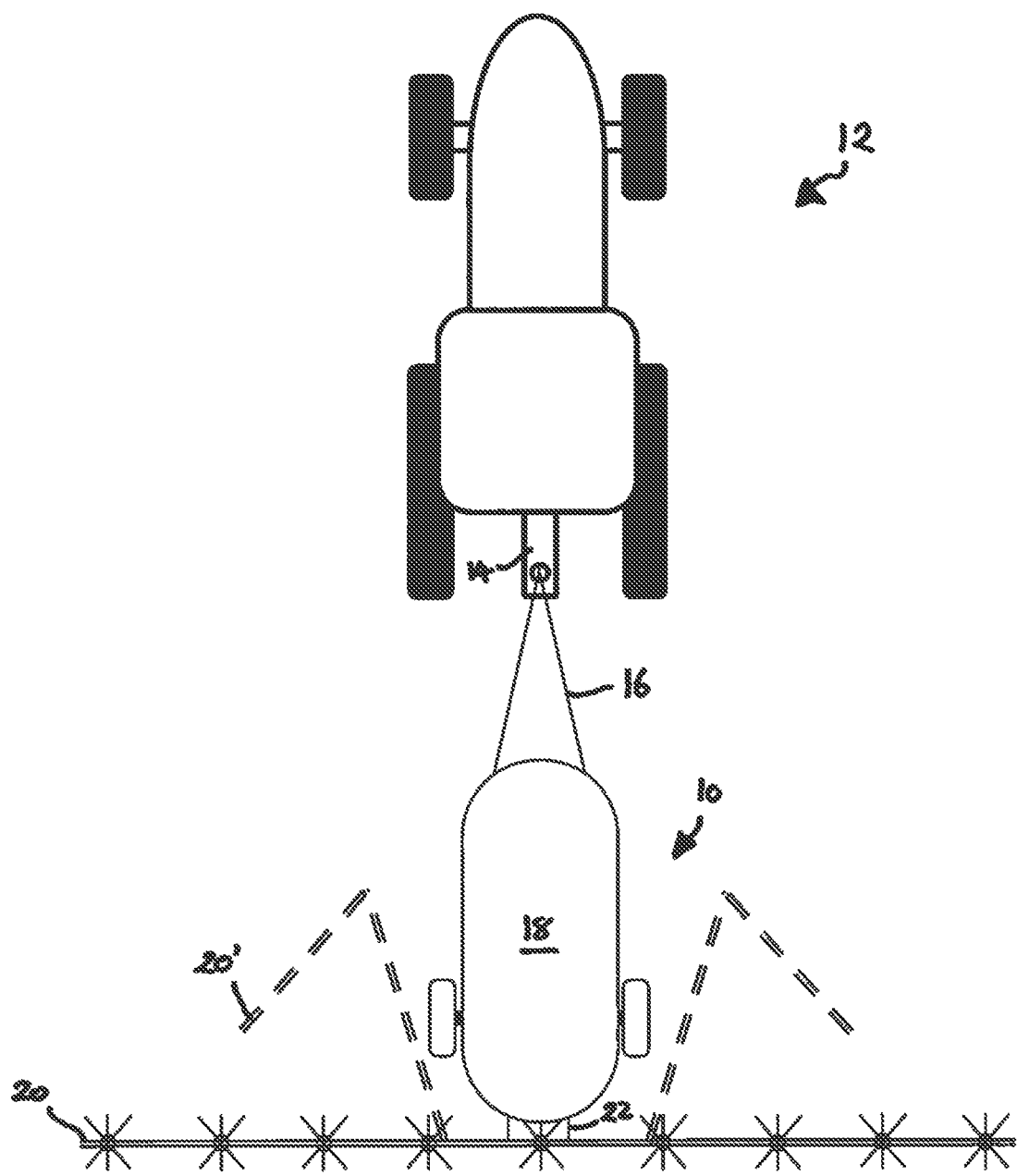
FIG. 2 is a schematic plan representation of the tractor and sprayer of FIG. 1.
Figure 3:
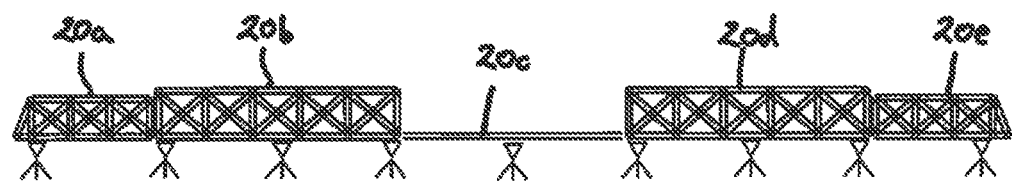
FIG. 3 is a rear view of the sprayer of FIG. 1 showing the multi-section boom in an unfolded configuration.

With reference to FIGS. 1, 2 and 3 a pull-type agricultural sprayer 10 is represented in schematic form from various views. The sprayer 10 is attached to the rear of a tractor 12 by means of towing hitch 14 associated with the tractor and a drawbar tongue 16 forming part of the chassis of the sprayer 10. The sprayer 10 includes a storage tank 18 which serves to store the liquid material to be applied to a crop field.

A transversely-extending multi-section boom 20 is formed from five separate boom sections 20a to 20e which are connected by hinge means and aligned with one another in the operating configuration shown. In this configuration the boom 20 extends substantially at right angles to the forward direction of travel, represented by arrow F in FIG. 1.

A central boom section 20c is fixed to the rear of the sprayer 10 by a suitable linkage represented at 22. As in known sprayer machines, the linkage 22 may permit raising and lowering of the boom to adapt to different crops and conditions.

The boom 20 further comprises a left-hand boom assembly and a right-hand boom assembly each hingeably mounted to respective ends of the central boom section 20c for pivoting movement around a substantially vertical axis. Left-hand boom assembly comprises an inner boom section 20b mounted to the central boom section 20c and an outer boom section 20a hingeably connected to the inner boom section 20b. Right-hand boom assembly comprises an inner boom section 20d mounted to the central boom section 20c and an outer boom section 20e hingeably connected to the inner boom section 20d.

The pivoting connections between the respective boom sections 20a-e allow the multi-section boom 20 to be folded into a transport configuration represented schematically by dashed 20'. It should be recognized that the folding mechanism and construction of the boom 20 is shown in highly schematic form and is not particularly relevant to the invention. Moreover, it should be noted that the central boom section 20c may be lighter in construction because it does not encounter the large bending forces experienced by the other boom sections 20a, 20b, 20d, 20e.

The various embodiments of the invention to be described below relate to the construction of a boom (or boom section) for mounting to an agricultural sprayer such as that shown in FIGS. 1 and 2. It should be understood that the boom constructions described hereinafter can be used in conjunction with different types of agricultural sprayer including mounted, trailed and self-propelled.

The following description makes reference to "booms" but it should be understood that the constructions described can be applied to a single boom section of a multi-section boom, and the term "boom" shall encompass "boom section" also.

The boom constructions described hereinafter embody one or more inventive aspects which will be described in turn for clarity and highlighted, where possible, with subheadings.

HSS Boom Construction

Figure 4:
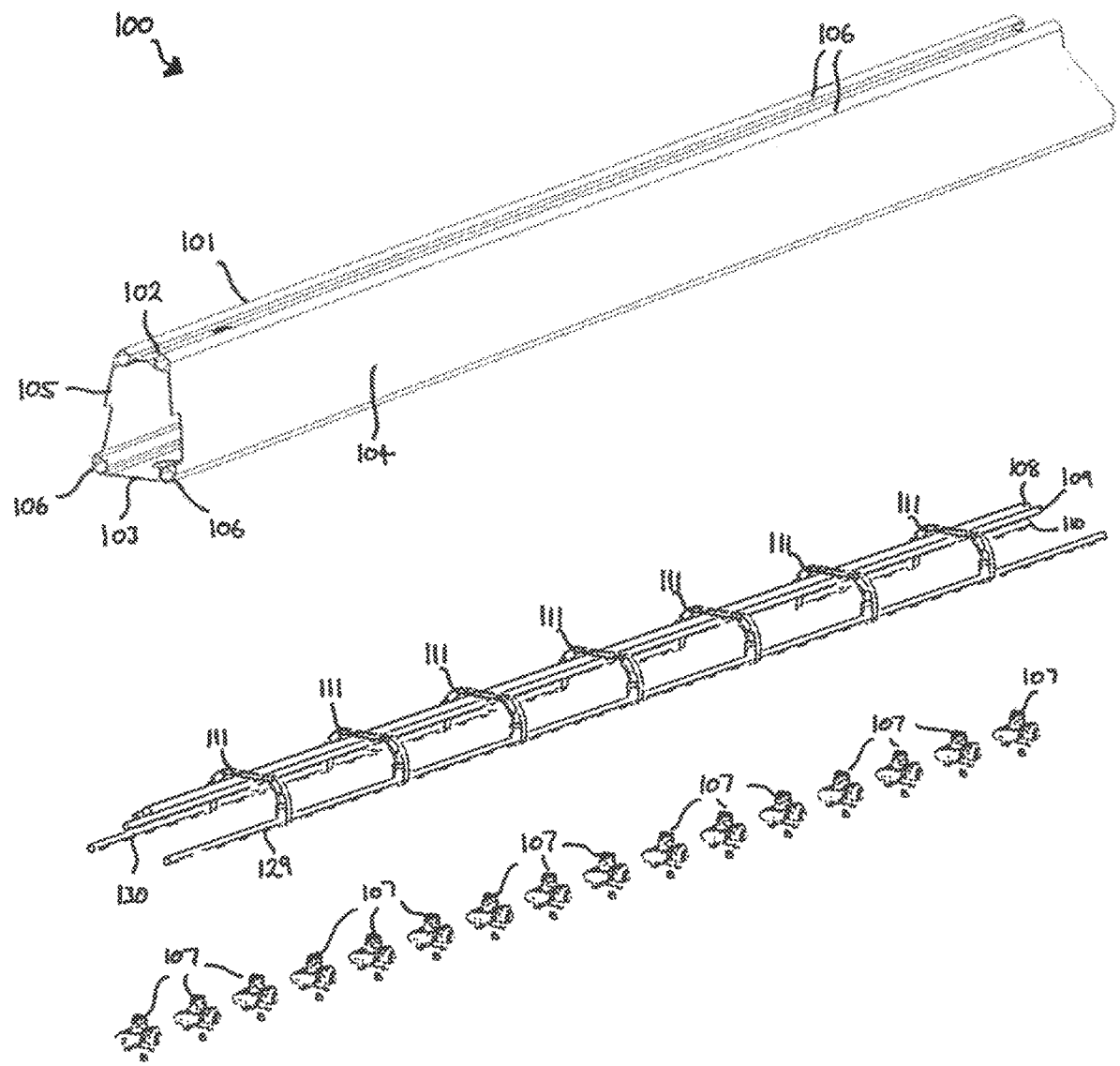
FIG. 4 is a part exploded, perspective view of a boom section comprising a hollow structural section frame member.
Figure 5:
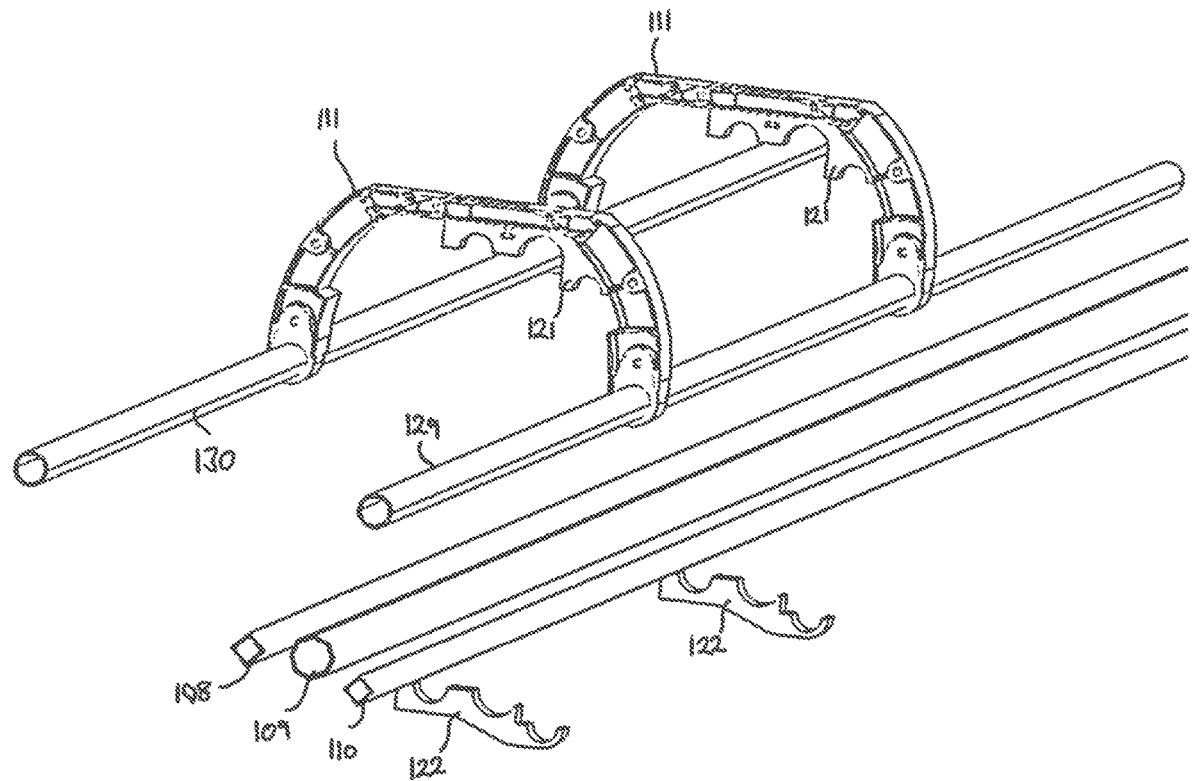
FIG. 5 is a part exploded perspective view showing some of the brackets, plumbing and guard members of the boom of FIG. 4.
Figure 6:
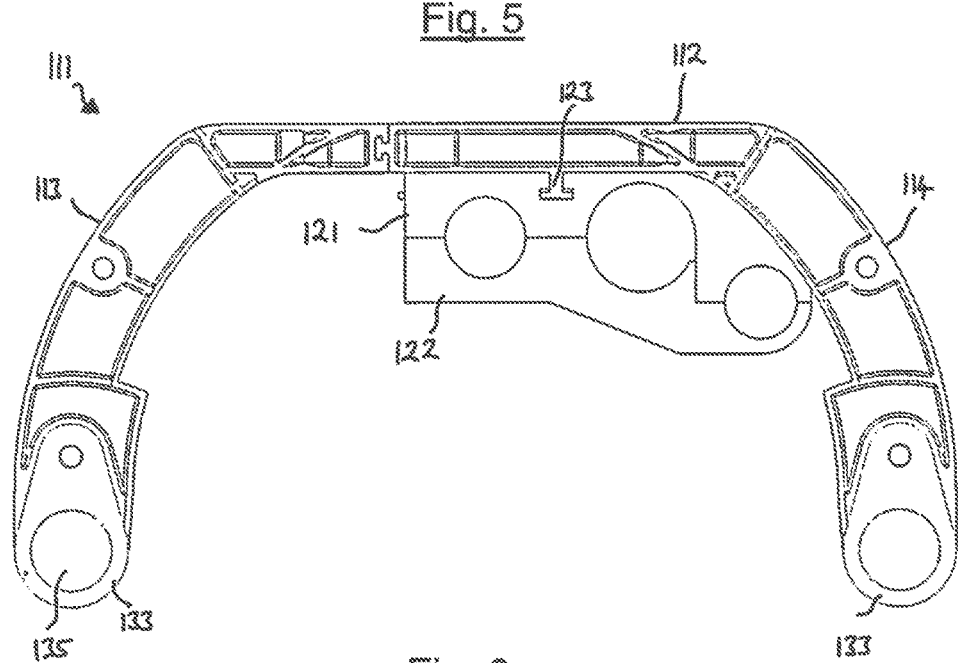
FIG. 6 shows a side elevation of one U-shaped bracket together with clamps for securing the pipework.
Figures 12, 13:
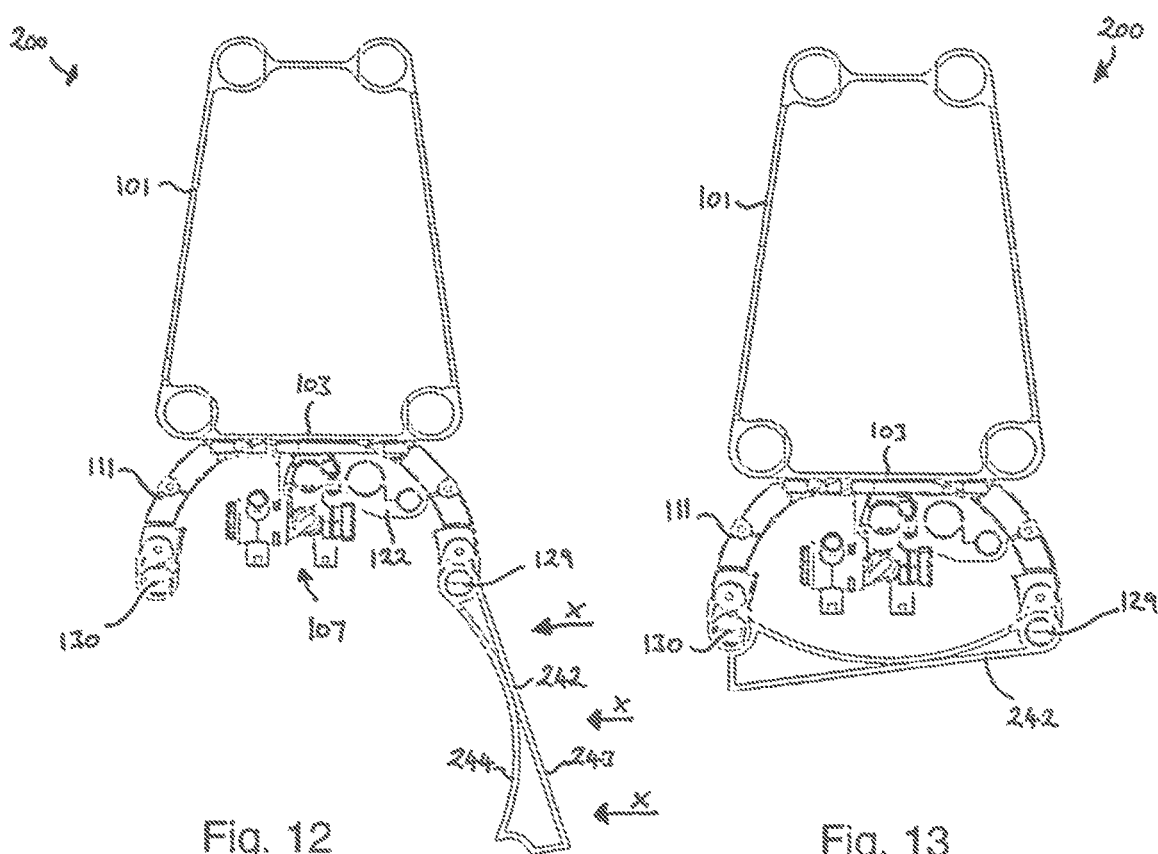
FIG. 12 is an end view of the boom of FIG. 11.
FIG. 13 is an end view of the boom of FIG. 11 showing the drip tray in a closed position.

With reference to FIG. 4 a boom section 100 comprises a frame member 101 formed from a length of hollow structural section (HSS). The frame member 101 comprises a top plate 102, a bottom plate 103, a front plate 104 and a rear plate 105 together forming a trapezium-shaped profile wherein the top plate 102 is narrower than the bottom plate 103. Tubular strengthening members 106 are provided in each corner of the profile and extend through the length of the frame member 101. FIG. 12, for example, shows a vertical section of the frame member 101 having the trapezium-shaped profile.

The frame member 101 is formed from an extrusion process which is a well-known technique in producing HSS members. Alternatively the frame member 101 may be formed from a pultrusion process.

The frame member 101 is preferably formed from aluminum. Alternatively, a composite material may be used.

The unitary frame member 101 provides the structural strength of the boom and withstands the bending moment subjected thereon. Being hollow, the frame 101 is lighter than conventional truss-based booms thus reducing the stresses on the hinges between adjacent boom sections. Moreover, the bending-induced stresses are spread along the length of the extruded member rather than being focused at peak points as in known truss-based constructions. The overall boom construction is therefore more capable of tolerating the stresses associated with being driven over rough ground. The lighter construction facilitates greater design freedom in producing longer booms whilst keeping within stress tolerances.

The use of extrusion to produce the boom frame delivers a significant cost saving over conventional truss-based booms available on the market today. Lengths of HSS can be stockpiled by manufacturers and simply cut to the desired length when required. Advantageously, this allows a 'just-in-time' approach to supplying parts to the assembly line without having to stock several different parts and still allowing a wide range of boom lengths to be assembled on the same line.

Turning back to FIG. 4, a plurality of liquid application devices in the form of nozzles 107 are mounted to the underside of the HSS frame member 101. It should be understood that, today, the nozzles employed may form part of multi-nozzle devices which may include integrated valves and permit the operator to select the nozzle most suited to the application in hand. It should be understood that the multi-nozzle devices 107 illustrated in FIG. 4 may be replaced by basic single nozzles without deviating from the scope of the invention.

The nozzles 107 serve to apply the pesticide or nutrient solution to the crop from above in the form of a jet or mist in a known manner.

Liquid delivery means connected to the nozzles 107 are also mounted to the underside of the HSS frame member 101.

The term liquid delivery means is intended to encompass the plumbing required to convey liquid from the storage tank 18 to the nozzles 107. The plumbing may comprise return lines used for flushing the pipe work after completion of the spraying operation. In the embodiment shown in FIG. 4, three linear pipes 108, 109, 110 are shown extending along the length of the boom section 100. First pipe 108 conveys fluid to an adjacent boom section 100. Second pipe 109 conveys fluid to the nozzles 107. Third pipe 110 is a return pipe.

A plurality of U-shaped brackets 111 are secured to the underside of the frame member 101 in a spaced relationship. The example shown in FIG. 4 illustrates seven brackets 111 but it should be understood that more or less may be employed as required. The brackets 111 serve to support the pipes 108, 109, 110 together with a front tubular guard member 112 and a rear tubular guard member 113. Nozzles 107 (including associated valves) are clamped and plumbed to the pipes 108, 109, 110 as required.

The brackets 111 and attached functional components are described in more detail hereinafter with reference to FIGS. 5 to 8. As can best been seen from FIG. 6, each bracket 111 has an upside down U-shaped profile having a linear central section 112 and two, curved, end sections 113, 114. Each bracket 111 is secured to the base plate 103 by means of bolts or rivets (not shown) which pass through holes 115 provided in the straight section 112.

Figure 8:
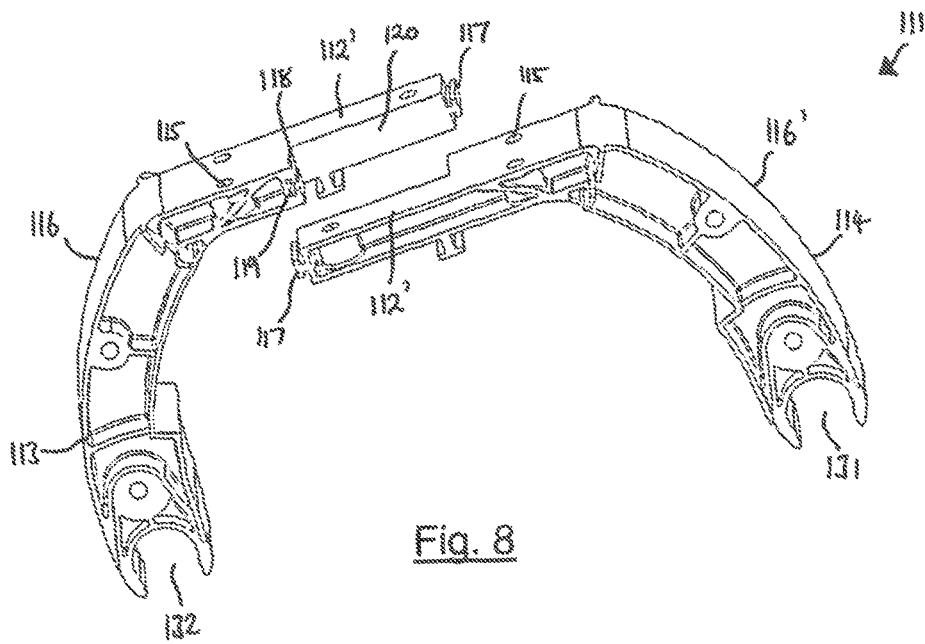
FIG. 8 shows an exploded, perspective view of the bracket of FIG. 6.

To provide increased modularity each bracket 111 is formed from two identical portions 116, 116' that interlock with one another and shown in separated form in FIG. 8. Each portion 116, 116' includes a straight segment 112' and a respective one of the two end sections 113, 114. At the open end of each straight segment 112' a T-shaped peg 117 is provided. Each straight segment 112 includes a shoulder 118 in which a corresponding T-shaped slot 119 is provided. The pegs 117 each slideably engage into a respective one of the slots 119 provided on the other portion up to a position in which respective faces 120 provided in the straight segments 112' abut. The reason for providing a two-part bracket structure will be explained further below.

The pipes 108, 109, 110 are secured to each bracket 111 by means of a two-part clamp having an upper part 121 attached to the bracket 111 and a lower part 122 secured to the upper part 121. Interlocking means are provided to facilitate simple mounting of the pipework to the frame. Firstly, the upper part 121 is mounted to the bracket 111. Best seen in FIG. 7, a T-shaped peg 123 provided in the straight segment 112' of each bracket portion 116, 116' is slideably received in a corresponding T-shaped slot 124 provided in the top surface of top clamp portion 121.

The pipes 108, 109, 110 are then located into position in recesses 125, 126, 127 formed in the top clamp portion 121. The lower clamp portion 122 is then placed into position and secured to the top portion 121 by means of screws inserted through holes 128 provided in both portions and the bracket 111. (It should be understood that the pipes 108, 109, 110 are omitted from FIGS. 6 and 7 for clarity.)

The clamping portions 121, 122, when secured in place, exert a clamping force on the pipes 108, 109, 110 to prevent movement of the pipework relative to the frame 101. Alternatively, the clamps may simply serve to retain the pipes 108, 109, 110 and permit a degree of linear movement so as to accommodate flexing of the boom section 100 without detrimental effects to the plumbing joints associated therewith.

Figure 7:
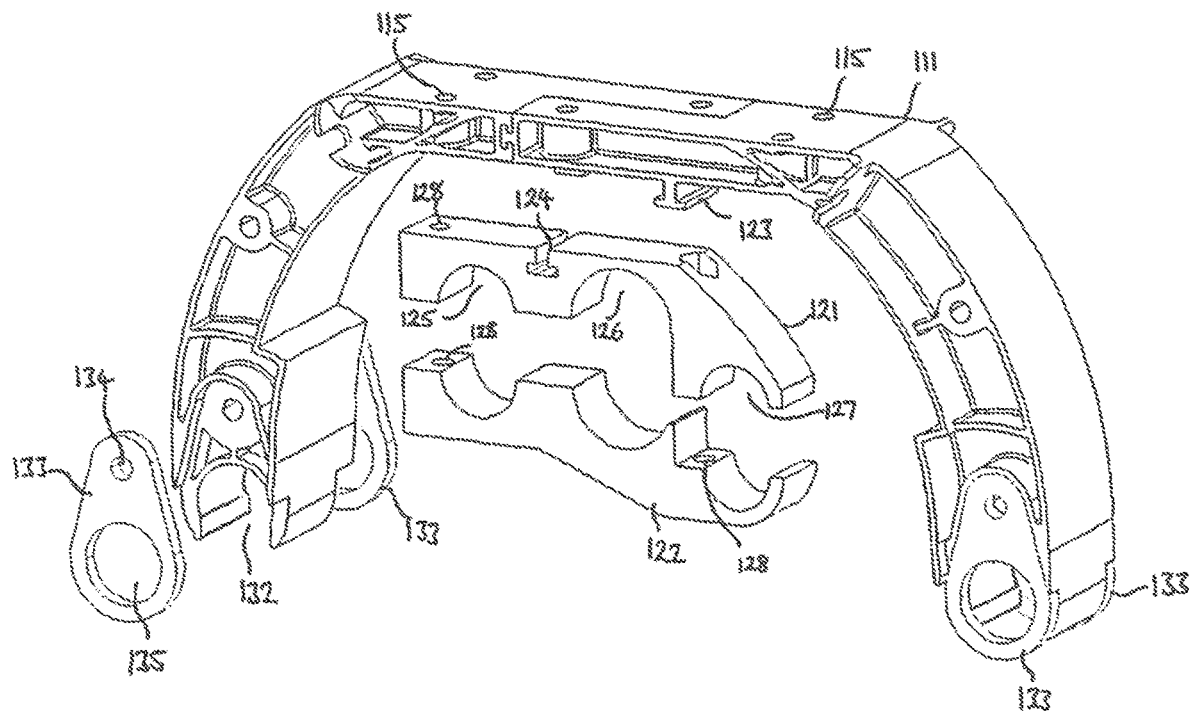
FIG. 7 shows a part exploded, perspective view of the bracket and clamp assembly of FIG. 6.

As briefly mentioned above, each bracket 111 holds in place a front tubular guard member 129 and a rear tubular guard member 130, each serving to provide protection to the nozzles 107, plumbing, and pipework from impacts with external objects. It shall be understood from FIGS. 5 to 8 that each guard member 129, 130 snap fits into a receiving recess 131, 132 provided at the extreme ends of each bracket 111. Each recess 131, 132 has an associated pair of elliptical retainers 133 each having a small hole for receiving a securing pin (not shown) and a larger hole 135 through which the associated guard member 129, 130 is inserted and retained in position. It should be understood that FIG. 7 shows the retainers 133 for the rear guard member 130 in exploded form.

Some boom constructions demanded by customers may require only one of a front or rear guard member. By forming the brackets 111 from two portions 116, 116', the manufacturer has the option to fit only one portion thus providing modularity in assembly. For example, if a customer requires only a front guard member 129 the rear portion 116 of each bracket 111 can be simply omitted, thereby saving cost. Furthermore, since the two portions of bracket 111 are identical, savings can be made through economies of scale and the number of different required components on the assembly line is reduced.

In addition to guard members 129, 130, front and rear windshields 136, 137 (FIG. 9) may be provided to shield the sprayed liquid from ambient air flow thus reducing spray drift. Each windshield 136, 137 comprises a plate shaped to conform substantially to the curved profile of brackets 111 and bent to include a cylindrical sleeve 138 (FIG. 10). During assembly one of the guard members 129, 130 is inserted through the sleeves 138 of the respective windshields 136, 137 to hold them in place. Screws 139 are inserted through holes 140 provided in the windshield, the screws securing the windshield to tabs 141 provided by the brackets 111.

The modularity offered by the construction allows any combination of front and/or rear windshields to be included. The construction of the front windshields 136 is preferably identical to that of the rear windshields 137 so as to reduce the components present on the assembly line and reduce costs further.

Figure 9:
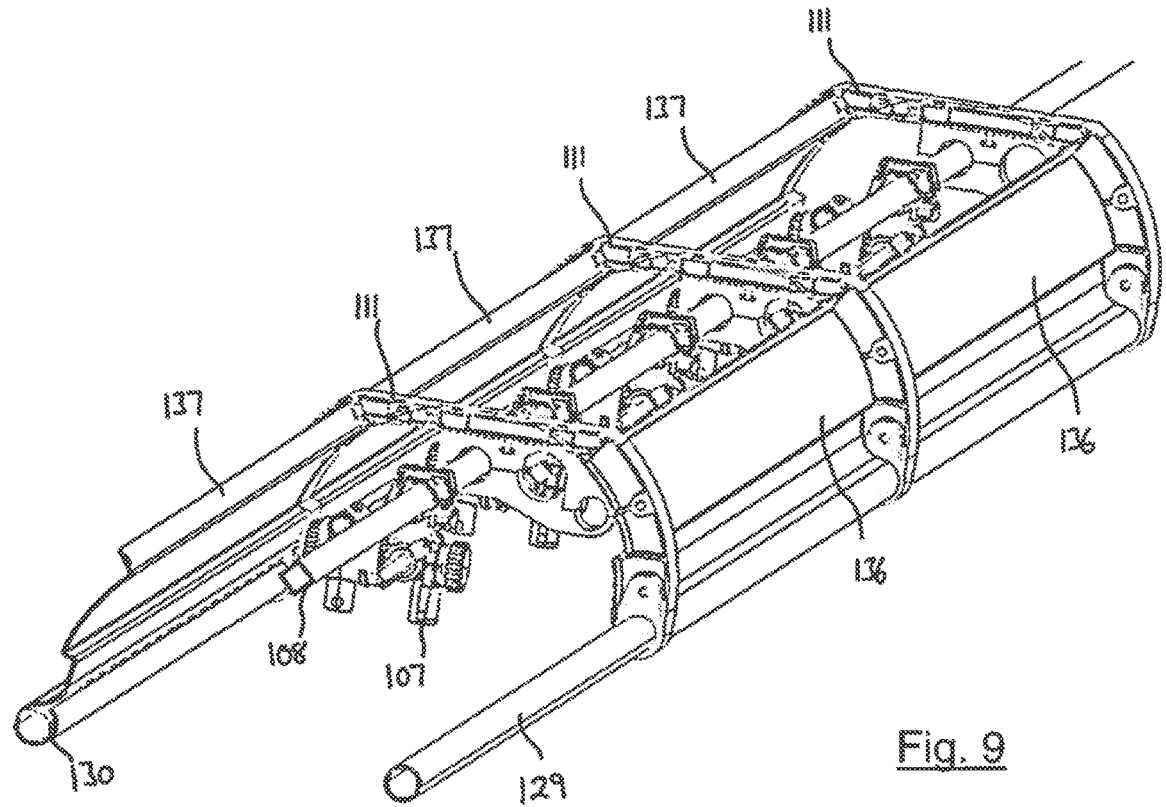
FIG. 9 is a perspective view of part of the boom of FIG. 4 omitting the frame member for clarity and shown fitted with a number of windshields.
Figure 10:
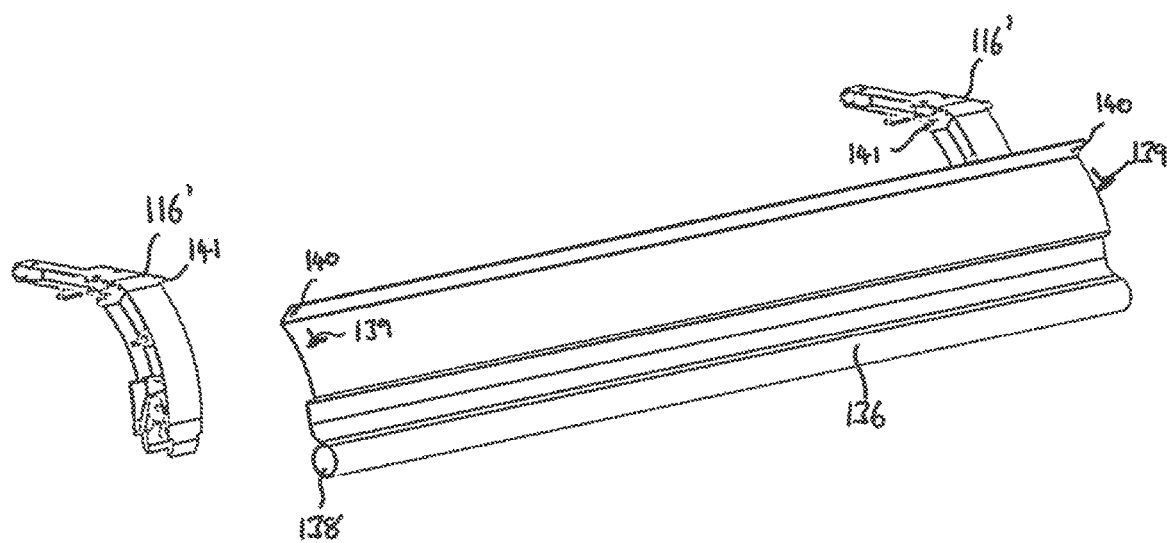
FIG. 10 shows a windshield of FIG. 9 with associated bracket portions.

It should be understood that FIG. 9 shows one of the front windshields omitted for clarity together with pipes 109, 110 and extruded frame member 101.

The brackets 111 are preferably molded from a plastic material. Alternatively aluminum or a composite material may be used. The commonality between the brackets 111 applied to a multitude of boom sections in the same machine provides cost saving through economies of scale.

Moveable Drip Tray

Figure 11:
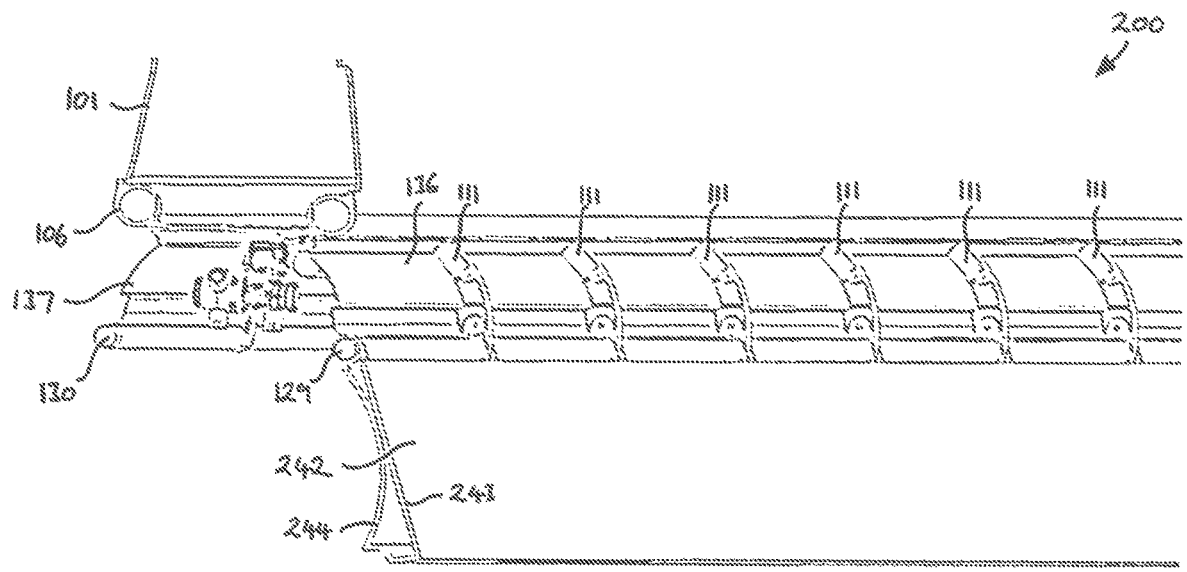
FIG. 11 shows a perspective view of part of a boom in accordance with a first embodiment of the invention having a pivotable drip tray shown in an open position.

A boom 200 according to a first embodiment of the invention is shown in FIGS. 11, 12, and 13, the construction of which is essentially the same as that described above but with the addition of an elongate drip tray 242 pivotally mounted along a front lower edge of the boom 200. The drip tray 242 is substantially rectangular and has a double-skin structure having an outer skin 243 and an inner skin 244. The tray 242 is preferably formed also from an extrusion process and may be formed from a plastic material for minimizing weight and cost. In the embodiment shown, the outer skin 243 is substantially planar, and the inner skin 244 has a concave profile.

The tray 242 is pivotally mounted along an axis defined by the front tubular guard member 129 which itself is supported by the bracket 111. Various means of hinging the tray 242 along the axis are envisaged but may, for example, include a plurality of spaced sleeves integrated within the double skin and through which the front guard member 129 is inserted.

In an operating configuration (FIGS. 11 and 12) the tray 242 extends forwardly of the frame 101 with respect to the normal direction of travel F and downwardly away from the frame so as to impact upon an airflow incident thereon as the sprayer moves across a field. Arrows X shown in FIG. 12 represents the airflow. The sprayed liquid is shielded from the airflow X thus reducing drift. In other words, the drip tray 242 acts as a baffle plate to shield the applied liquid from ambient wind.

In a second, transport, configuration (FIG. 13) the drip tray 242 is in a closed position and extends substantially horizontally beneath the nozzles 107 to prevent the applied material from leaking onto the ground below. The concaved profile of the drip tray 242 serves to collect any drips in a smaller area thus making it easier to mop up or collect as required.

The provision of a drip tray on the boom itself offers significant advantages over the current state of the art. There is growing pressure from sprayer manufacturers to provide means to prevent potentially harmful pesticide from dripping on to the ground when not in operation for environmental reasons. The bulky nature of a drip tray has been found to hinder the folding functionality of a multi-section boom and has thus so far only been provided as an item that is fixed to the spray vehicle below the folded boom.

A drip tray that is pivotally mounted on the boom can also serve as a baffle plate which reduces drift as described above. Actuator means (not shown) such as hydraulic or pneumatic cylinders may be employed to move the drip tray 242 between the open and closed positions to avoid the need for the operator to leave his cab. For example, a simple hydraulic cylinder may be connected between a fixed position on the boom 200 and the drip tray 242 to pivot the latter as required. However, it is envisage that the drip tray 242 may be moved manually between the open and closed positions and, in addition, latch means may be provided to secure the drip tray 242 in one or both positions.

The design of the upside down U-shaped brackets 111 is particularly attractive when used in conjunction with a pivotable drip tray as shown in FIGS. 11 to 13. An axis defined by the front guard member 129 is particularly suitable for providing a hinge axis for the drip tray 242 because it resides below the nozzles 107. Furthermore, the opposite end of the brackets 111 approximate the rear lower edge and the rear guard member 130 offers a suitable stop means upon which the drip tray 242 can abut when in closed position (FIG. 13). Advantageously, this reduces movement of the drip tray 242 when in the closed position and provides a more secure seal for the collected material.

Figure 32:
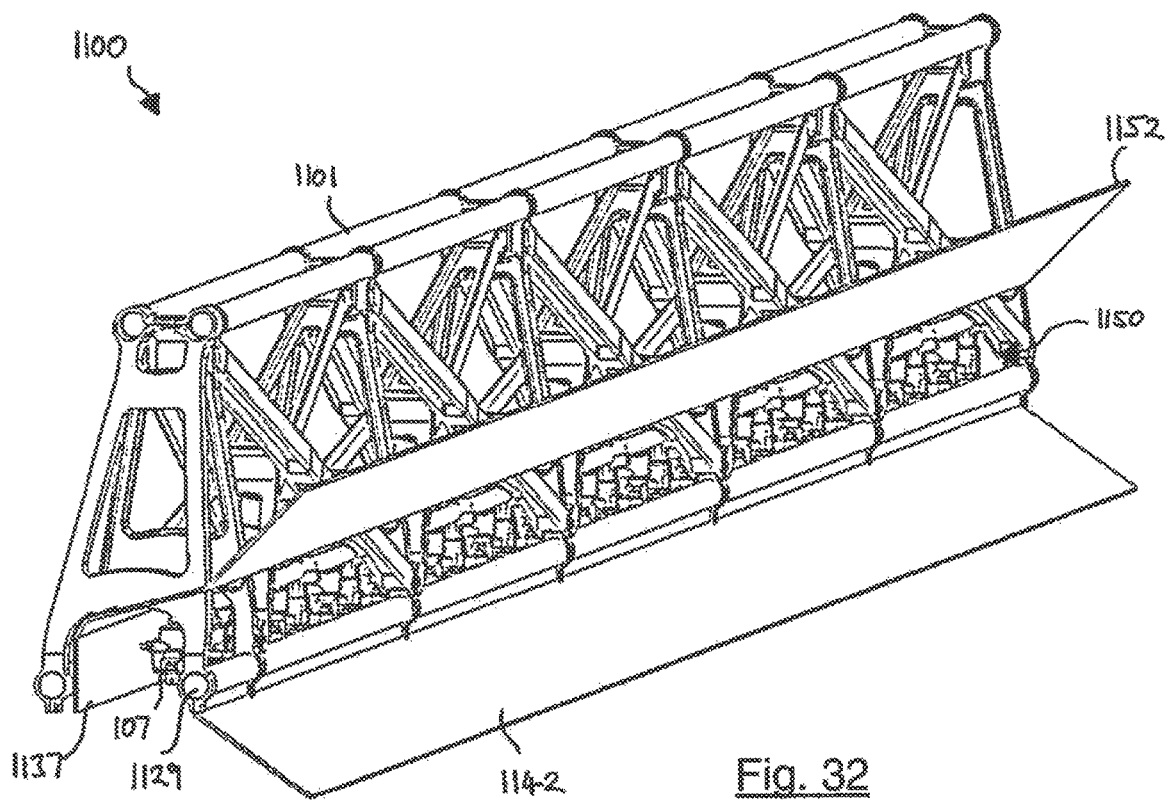
FIG. 32 shows a perspective view of boom in accordance with a sixth embodiment of the invention; and, FIGS. 33 and 34 show end on views of the boom of FIG. 32 showing the baffle plates provided in an operating and non-operating position respectively.
Figure 33:
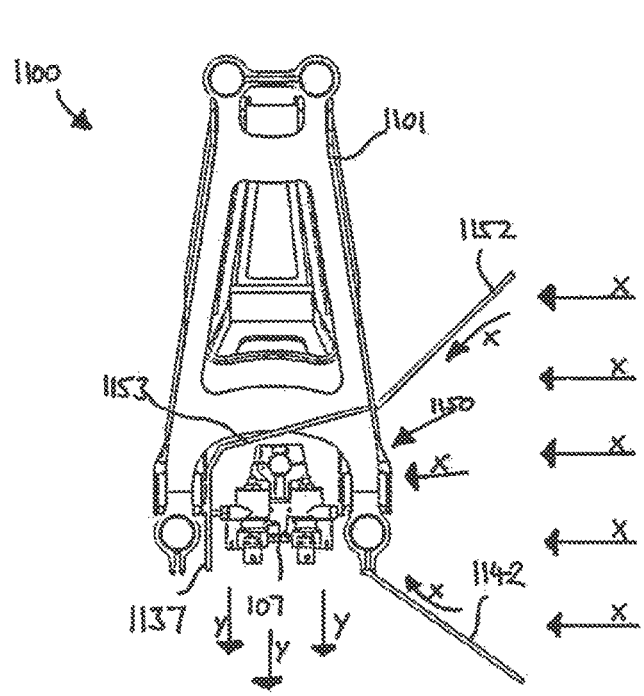
Figure 34:
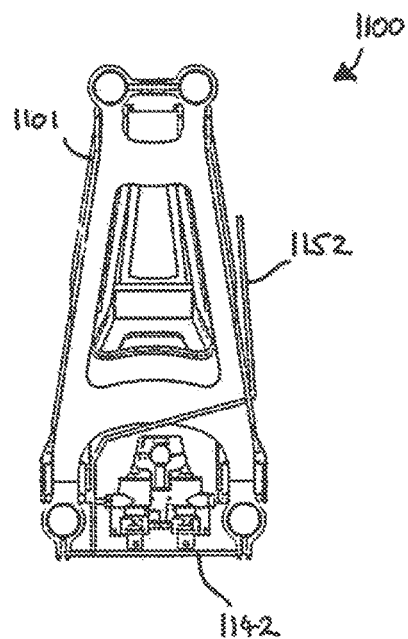

Although shown as mounted to a boom having a hollow structural section frame 101, it is envisaged that a pivotable drip tray in accordance with the invention may be fitted to alterative boom constructions. For example, FIGS. 32,33, and 34 illustrate a boom 1100 that includes a truss like frame reference generally at 1101. A drip tray 1142 is shown schematically as extending along the boom 1100 and being hingeably attached so as to pivot around an axis defined by a front tubular guard 1129 in a similar manner to that described above. It can be seen from FIGS. 32 and 33 that the drip tray 1142 extends both forwardly and downwardly to shield the sprayed jet Y from ambient airflow X thus reducing spray drift. When not in operation the drip tray 1142 can be pivoted into a closed position as shown in FIG. 34.

Figure 14:
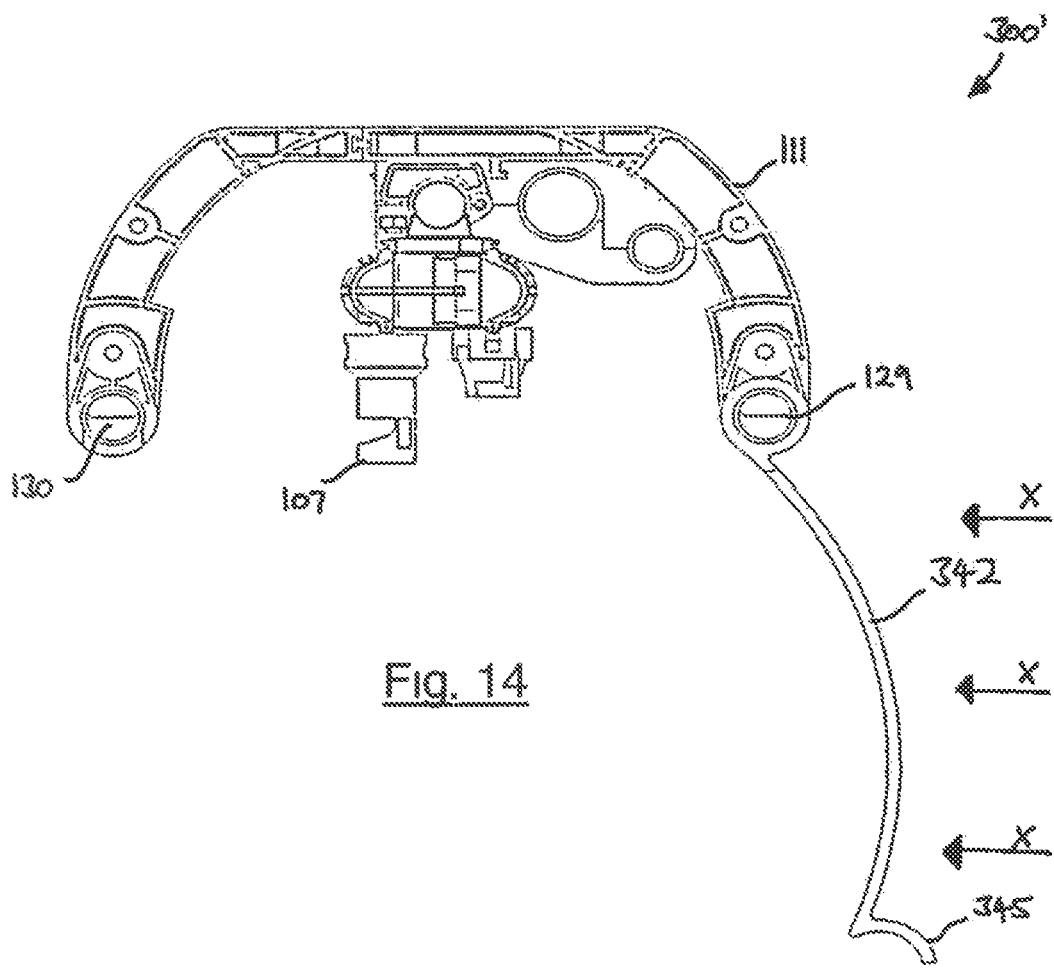
FIGS. 14 and 15 show an end view of the functional attachment portion of a boom according to a second embodiment of the invention comprising an alternative pivotable drip tray shown in an open position and a closed position respectively.
Figure 15:
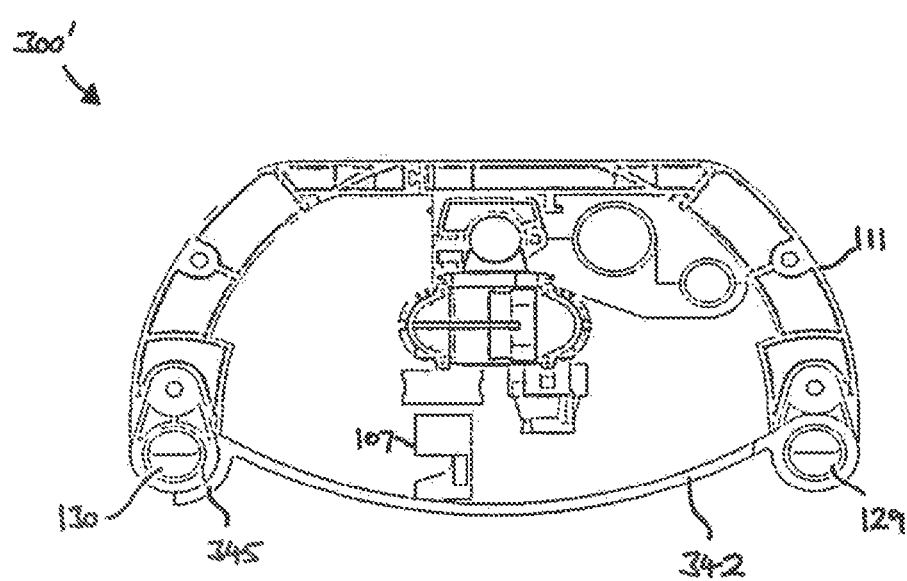

The functional attachment structure 300' (that is excluding the frame member) of a boom according to a second embodiment of the invention is illustrated in FIGS. 14 and 15. The double-skin drip tray 242 of the boom 200 illustrated in FIG. 11 is replaced with a single skin drip tray 342 which is similarly pivotally mounted to the front lower edge of the brackets 111. The drip tray 342 is profiled with a concave surface for collecting the drips in a similar manner in to that described above. A hook-like projection 345 is provided at the open end of the drip tray 342 opposite to the pivot axis and serves to abut the lower rear edge of brackets 111 proximate to the rear guard member 130 when in the closed position (FIG. 15).

Although shown so far as pivoting around an axis that is disposed along a lower edge of the boom, it is envisaged that the axis may reside higher up provided the drip tray is shaped accordingly and/or has a suitable linkage to allow the tray to reside under the nozzles when in the closed position.

Figure 19:
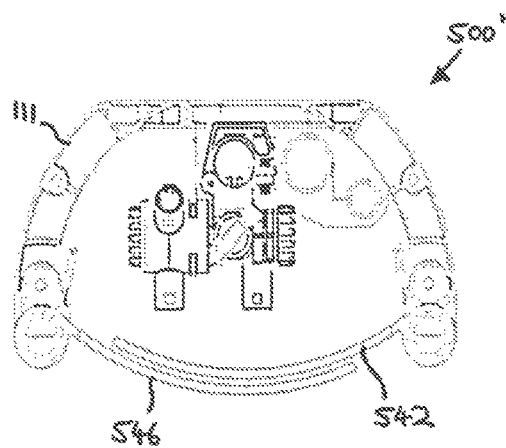
Figure 20:
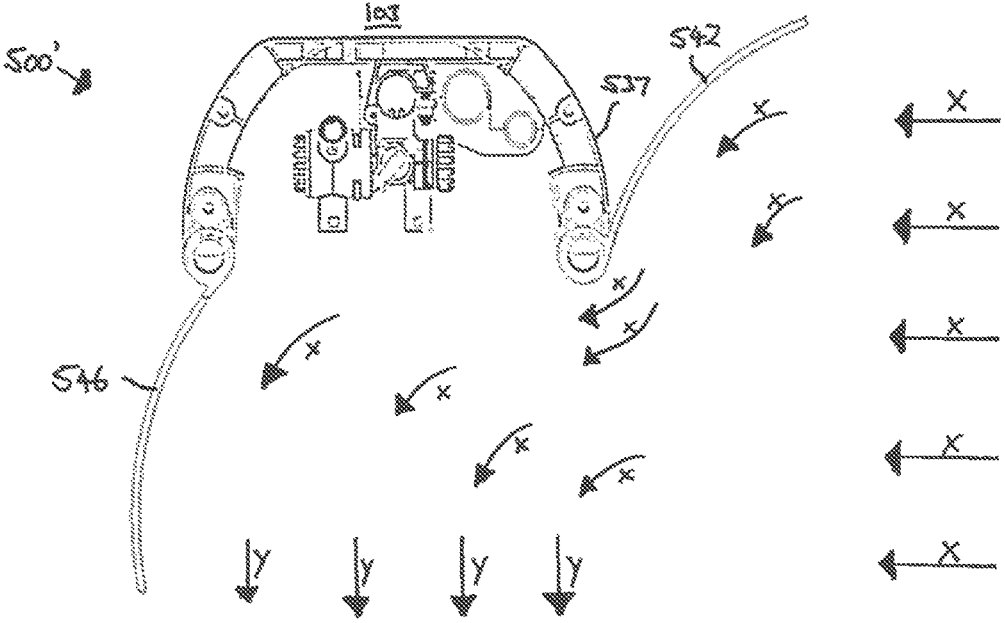

In an alternative construction shown in FIGS. 17 to 20 front and rear baffle plates 542, 546 are pivotally mounted along the front and rear lower edges of a boom 500 respectively wherein each plate pivots between an open configuration (FIGS. 17 and 18) and a closed configuration (FIG. 19). It should be understood that each baffle plate 542, 546 can be hingeably mounted in a similar manner to that described above with reference to FIG. 14 for example. In the open configuration the baffle plates 542, 546 may extend downwardly and outwardly from the boom frame and serve to protect the delivery paths of the nozzles 107 from ambient airflow thereby reducing spray drift.

The effect of providing both a front and rear baffle plate delivers superior protection against drift when compared to the embodiments described above which include a single baffle plate.

In the closed configuration the baffle plates 542, 546 are pivoted into a closed position one at a time to provide a drip tray having similar functionality to that described above. The like concave profiles of the front and rear plates 542, 546 allows the two plates to nest together when in the closed position thereby providing a better seal and which prevents leakage of the collected drips. The configuration shown in FIG. 20 will be described in more detail below.

Figure 25:
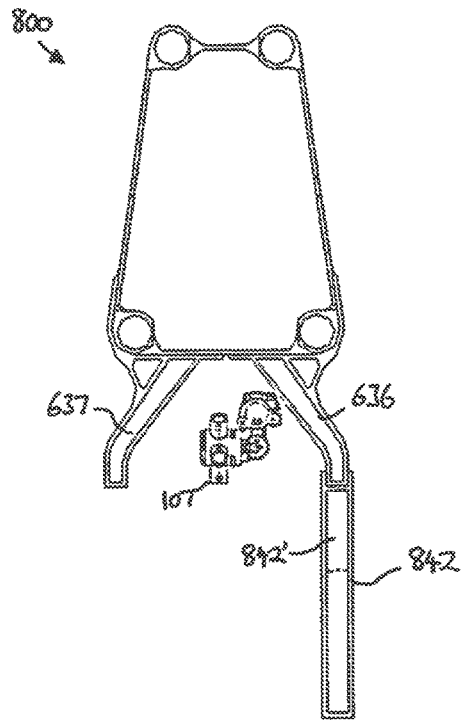
FIGS. 25 and 26 show vertical section views of a boom in accordance with an fifth embodiment of the invention showing a flexible drip tray in an open and a closed position respectively.
Figure 26:
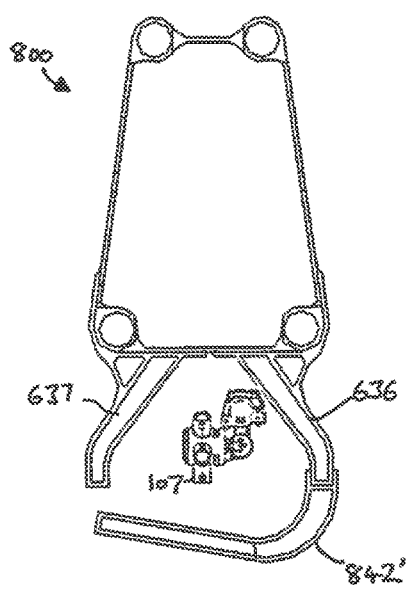

Maintaining the concept of a drip tray which is moveable to a position clear of the nozzle delivery paths, FIGS. 25 and 26 illustrate a boom 800 having a dual skin baffle plate 842 which includes an elongate flexible section 842' to facilitate configuration change. The baffle plate 842 is shown secured along an elongate edge to a front lower edge of the boom 800. The flexible region 842' allows the lower part of the plate 842 to flex between an open position (FIG. 25) and a closed, drip tray, position (FIG. 26).

Figure 27:
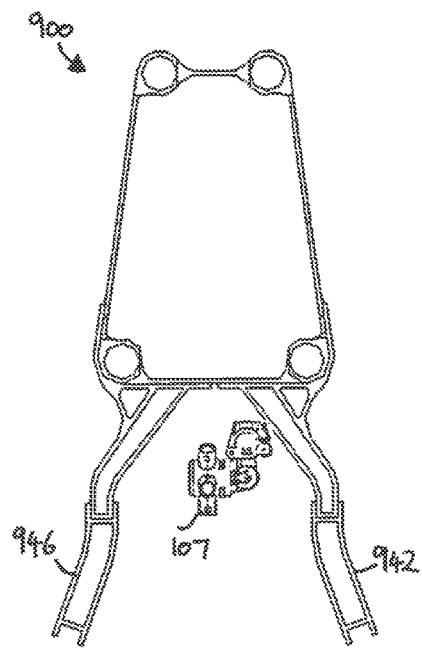
FIGS. 27 through 29 each show vertical section views of a boom in accordance with a fifth embodiment of the invention showing two flexible baffles in different positions.
Figure 28:
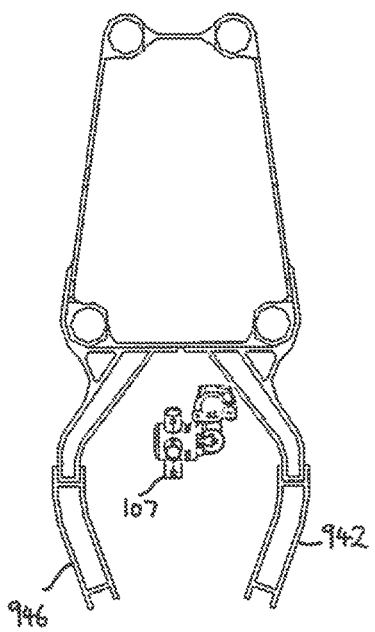
Figure 29:
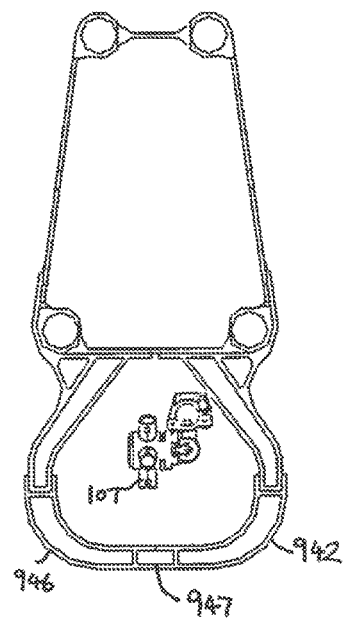

In yet an alternative construction shown in FIGS. 27 to 29, a boom 900 includes a drip tray that is provided by flexible front and rear baffle plates 942, 946 which are each secured to respective front and rear lower edges of a boom 900. In open positions (FIGS. 27 and 28) the baffle plates 942, 946 serve to shield the delivery paths of the nozzles 107. In a closed position (FIG. 29) the baffle plates 942, 946 flex so as to extend horizontally beneath the nozzles and meet in a central zone 947.

Self-Generating Airflow Acceleration

Figure 16:
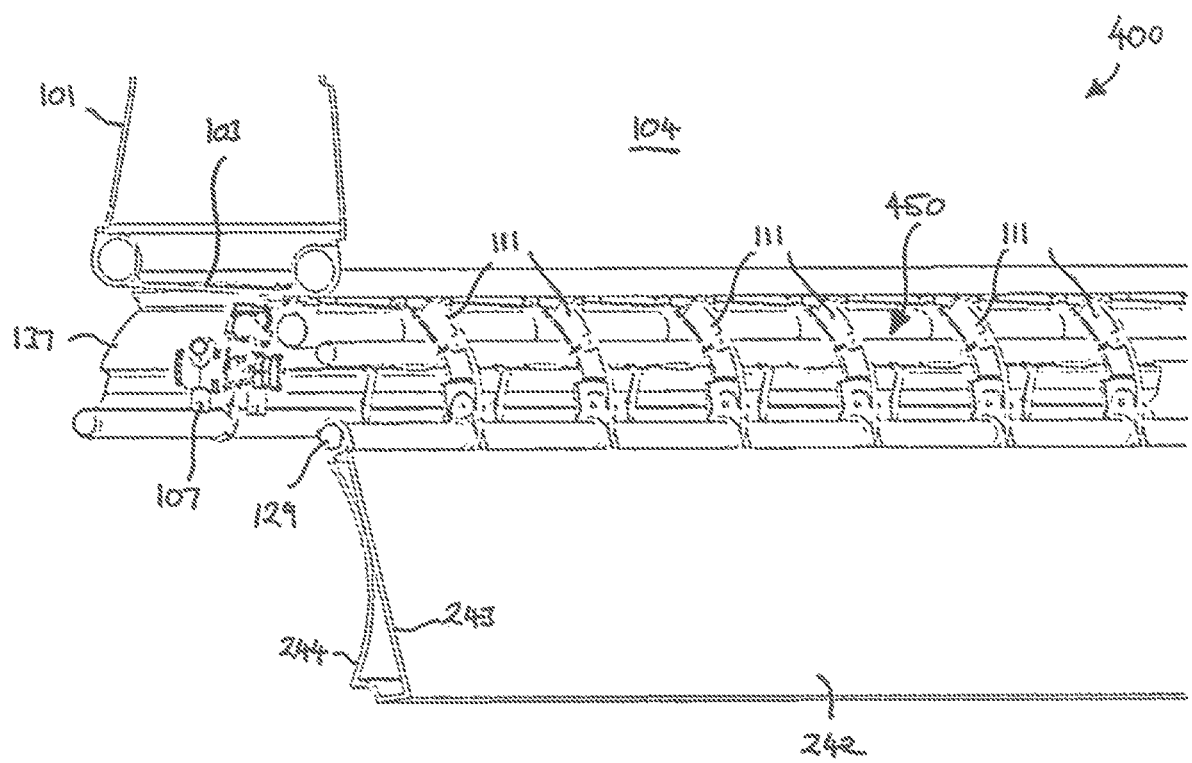
FIG. 16 is a perspective view of part of a boom in accordance with a third embodiment of the invention.
Figure 17:
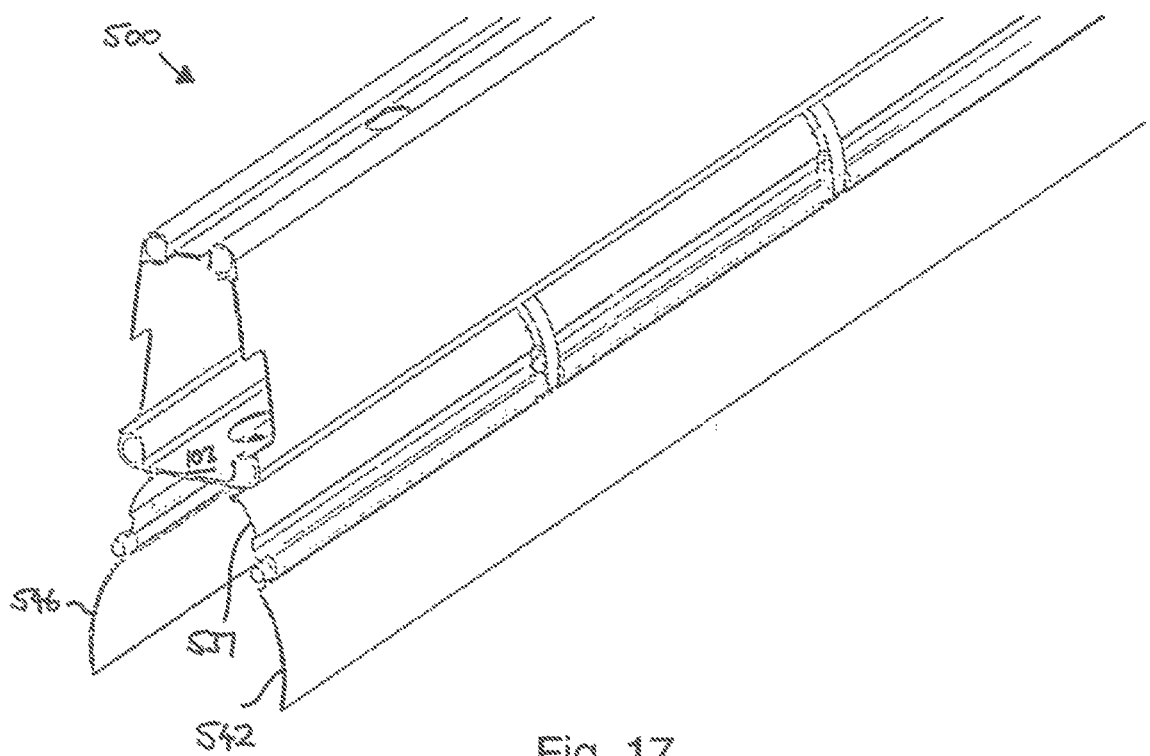
FIG. 17 is perspective view of part of a boom in accordance with a fourth embodiment of the invention.
Figure 18:
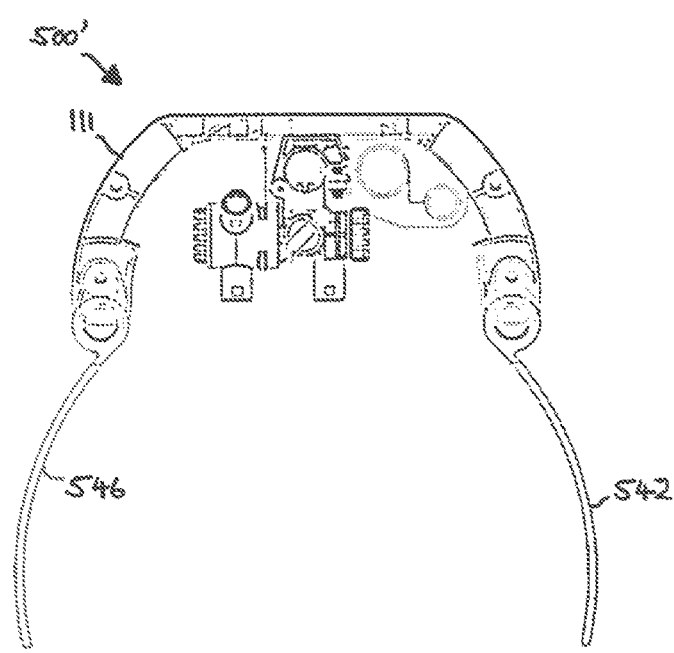
FIGS. 18, 19 and 20 each show an end view of the functional attachment portion of the boom of FIG. 17 showing the pivotable baffles in different positions.

The boom 400 illustrated in FIG. 16 is identical to the boom 200 illustrated in FIG. 11 except for the omission of the front windshield members 136. The end-on illustration shown in FIG. 12 can also be used to illustrate boom 400 shown in FIG. 16.

By omitting the front windshield 136 an elongate opening, designated generally by 450, is provided along the length of the boom 400 having a top edge defined by a lower edge of the front plate 104 and a lower edge coinciding with the front guard member 129.

The forwardly extending orientation of drip tray 242 serves to guide the airflow incident thereon toward and through the opening 450. As the sprayer moves across the field therefore, air is funnelled in through the opening 450.

Figure 30:
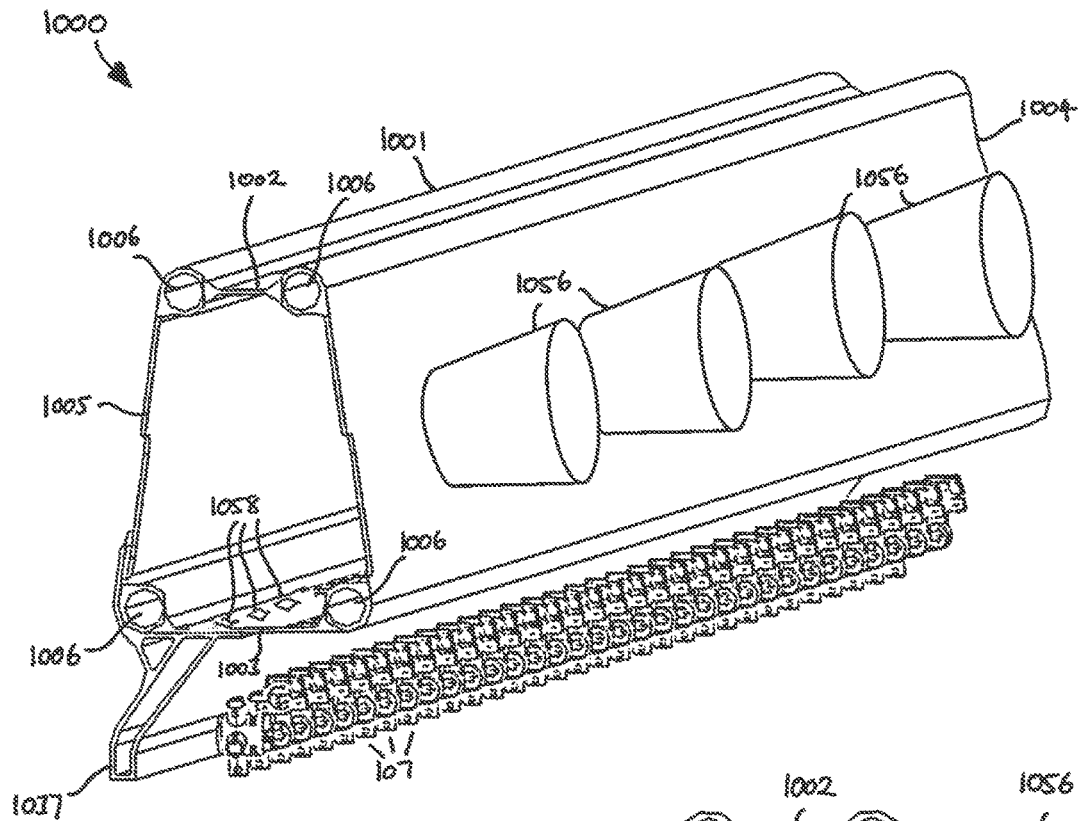
FIG. 30 shows a perspective view of a boom section.
Figure 31:
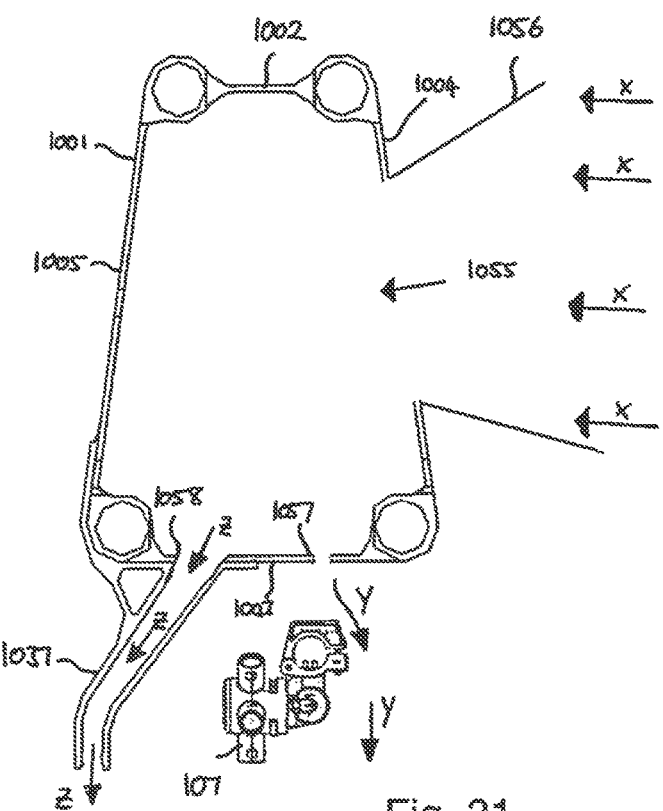
FIG. 31 shows a vertical section taken through the boom shown in FIG. 30.

The underside 103 of HSS frame member 101 and the rear windshields 137 together serve as baffle means which deflect the funnelled airflow downwardly in the direction of the spray delivery paths. Advantageously, the airflow in the vicinity of the applied liquid is accelerated downwardly towards the crop having two effects. Firstly, the applied liquid is, itself, accelerated thus reducing drift. Secondly, the downward airflow, which can be considered as a pressurized air curtain, serves to open up the crop canopy thus improving the penetration of the applied liquid into the standing crop.

The concept of providing a pressurized airflow in a downward direction along a boom is not new. However, existing solutions require a source of pressurized air which may include pumps, fans and reservoirs and which are expensive and cumbersome to accommodate on the machine. By providing means to funnel and deflect an airflow created by movement of the sprayer, a downward accelerating pneumatic force is provided in a simple and cheap manner using existing components.

The boom 1100 illustrated in FIGS. 32 to 34 also embodies the concept of a self-generating accelerating airflow. The pivoting drip tray 1142 described above is angled forwardly and downwardly when in the open position as shown in FIGS. 32 and 33. The drip tray 1142 in this position serves as an elongate baffle plate which, when the sprayer is in motion, serves to guide the incident airflow X upwardly into the front opening 1150.

An upper baffle plate 1152 is secured to the frame 1101 above the open section 1150 and is angled upwardly and forwardly away from the frame 1101 so as to funnel the airflow X downwardly into the open section 1150. Although shown as having a similar construction to the lower baffle plate/drip tray 1142, the upper baffle plate 1152 may take any suitable form and may, for example, comprise a curved profile to accentuate the funnelling effect.

In a similar manner to the boom 400 (FIG. 16) described above, a rear windshield 1137 acts together with a ‘ceiling’ baffle plate 1153 to serve as internal baffle means which guides the funnelled airflow X downwardly past the nozzles 107 in the direction of the sprayed liquid. The downwardly-exiting airflow is represented by arrows Y in FIG. 33. Advantageously, the downwardly-angled baffled plate 1142 also serves to shield the downwardly directed airflow Y, therefore increasing its effect and minimizing drift further.

For completeness, FIG. 34 shows the boom 1100 in a transport configuration wherein the lower baffle plate 1142 is folded under the nozzles 107 to form a drip tray as described above, and the upper baffle plate 1152 is pivoted around a pivot axis upwardly against the frame 1101. Advantageously, this reduces the size of the boom profile to ease folding of the boom sections with respect to one another as described in relation to FIG. 3 above.

Turning back to boom 500 illustrated in FIGS. 17 to 20, the self-generated accelerating airflow can be created by angling the front baffle plate 542 upwardly (FIG. 20). In this configuration, the front baffle plate 542 (which may also serve as a drip tray) serves to funnel the incident airflow X downwardly, under the front windshields 537. The rear baffle plate/drip tray 546 serves as a rear baffle to direct the incident airflow X downwardly. The base plate 103 of the HSS serves as a ceiling to prevent the airflow from escaping upwardly past the nozzles 107. Together, the base plate 103 and rear baffle plate 546 deflect the airflow X downwardly creating the beneficial effects describe above.

In yet another alternative boom construction that embodies the self-generated accelerated airflow, the HSS frame member 1001 of a boom 1000 is exploited to direct a funnelled airflow downwardly producing a similar effect similar to that described above. With reference to FIGS. 30 and 31, a HSS frame member 1001 having a trapezium-shaped profile includes a top plate 1002, a base plate 1003, a front plate 1004 and rear plate 1005, formed preferably by an extrusion process. In a similar manner to the HSS frame described with reference to FIG. 4, the frame member 1001 includes corner reinforcing tubes 1006 extruded in to the profile.

Cut into the front plate 1004 are a plurality of holes 1055 each having a tapered cone 1056 configured to funnel an incident airflow in through the hole 1055. With the provision of end plates (not shown) the hollow structural section frame member 1001 thereby forms a chamber that is pressurized as the sprayer moves forwardly across the field. A front set of vents 1057 provided in the base plate 1003 vent the funnelled air downwardly substantially in the direction of the sprayed liquid as represented by arrows Y in FIG. 31.

A rear set of vents 1058 provided in the base plate 1003 vent the pressurized air into a dual skin rear windshield 1037 which is secured by suitable means to the rear lower edge of hollow structural section frame member 1001. The vented air represented by arrow Z in FIG. 31 forms a pressurized curtain of air that opens up the crop canopy and/or accelerates the spray downwardly.

Although boom 1000 includes a front set of vents 1057 and a rear set of vents 1058 in conjunction with a double-skin windshield 1037, it is envisaged that different combinations of vents provided in the base plate 1003 are possible. For example, the rear windshield 1037 may be omitted and a simple set of vents that directly vent air in a generally downward direction may be employed instead.

The top plate 1002 and rear plate 1005 of the HSS serve as baffle means to direct the funnelled airflow X downwardly towards the vents 1057, 1058.

Pneumatic Canopy Opening

FIGS. 21 and 22 illustrate a boom 600 having a trapezium-shaped HSS frame member 601 which has a profile similar to that described in relation to FIG. 4. Mounted to the underside of frame member 601 is a front windshield 636 and a rear windshield 637. Although not shown in detail the windshields 636, 637 may be mounted to the underside of frame member 601 by any suitable means such as bolting, riveting or gluing.

The windshields 636, 637 have a dual skin structure which provides a respective air conveyance channel for channelling an airflow from vents 657, 658 provided in the base plate 603, to downwardly pointing vents 660, 661 provided along the bottom edge of each windshield. The internal chamber provided by the HSS frame member 601 is pressurized by an auxiliary air pump (not shown) provided on the sprayer or by funnel-like devices that are functionally similar to those shown in FIGS. 30 and 31.

The pressurized air is vented through vents 657, 658 into the respective cavities provided by the double-skin windshield 636, 637 via appropriate holes 662, 663 provided in the windshields. The air is vented through one or more slots provided along the bottom edge of each windshield 636, 637 so as to provide a pressurized air curtain which impacts upon the standing crop canopy. Arrows Z (FIG. 22) represent the vented airflow.

The vents or holes 660, 661 effectively form one or more air dispensing nozzles. A single linear slot may be provided along the length of the windshield to dispense a substantially planar jet (or curtain) of pressurized air extending in the direction of the boom axis.

Figure 21:
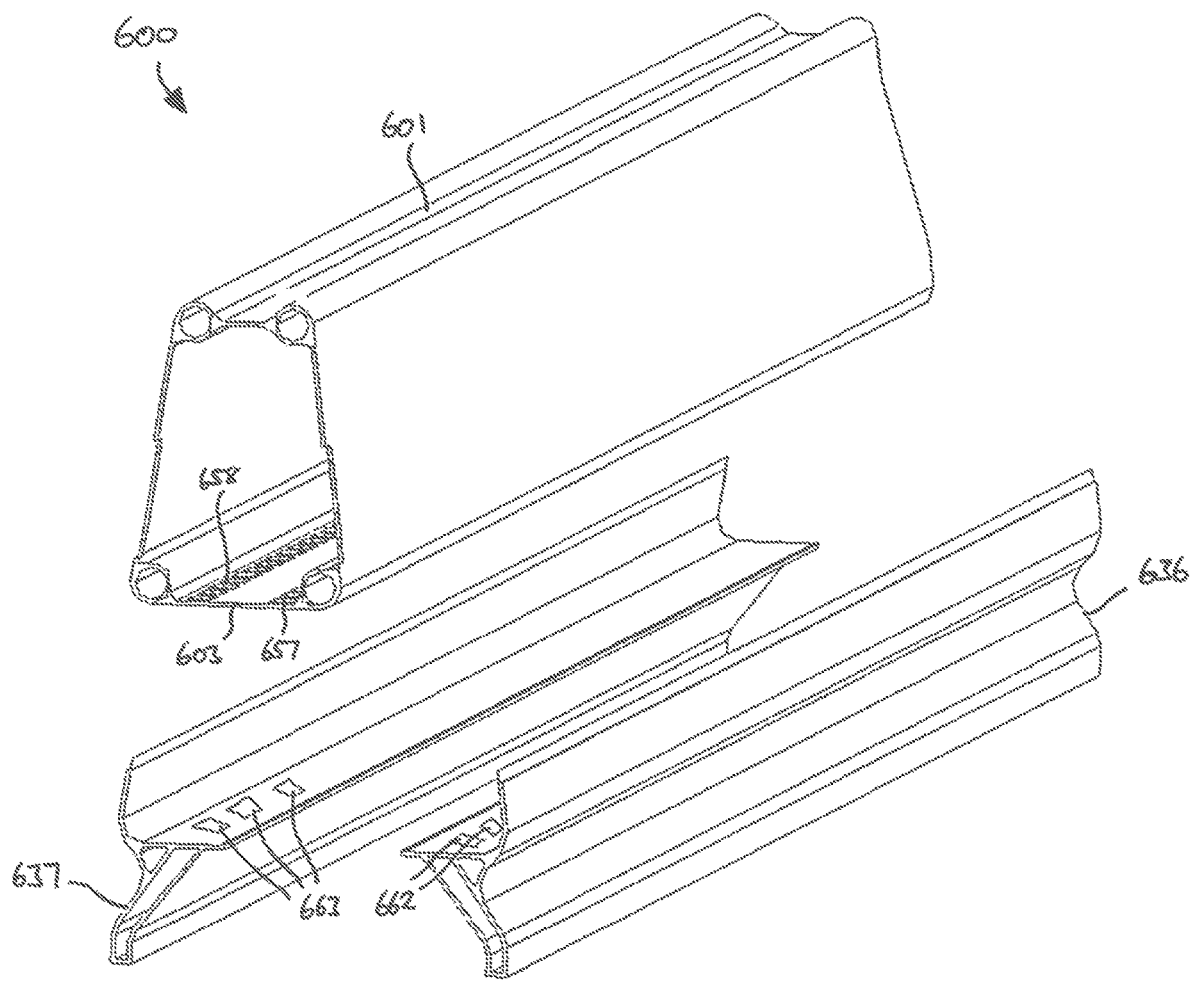
FIG. 21 is an exploded perspective view of a boom section according to alternative construction.
Figure 23:
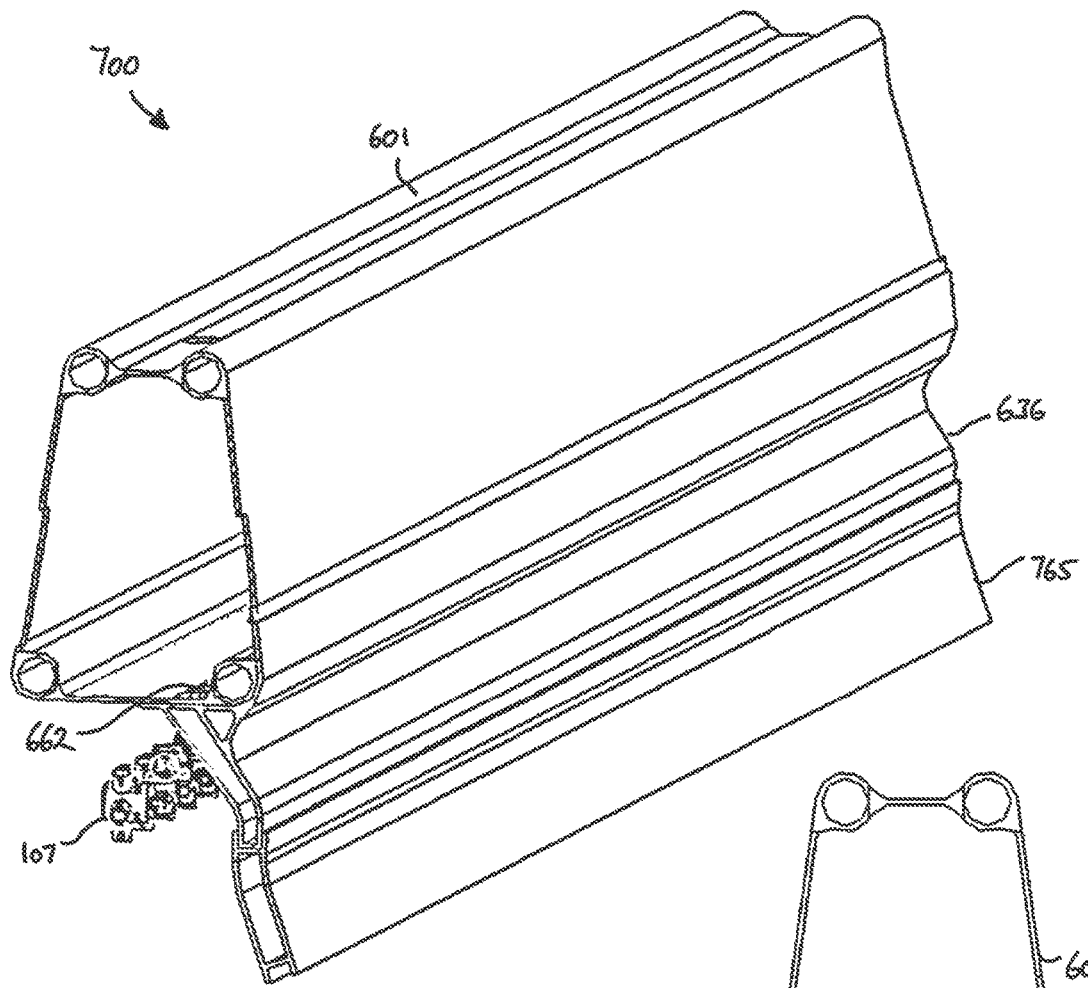
FIG. 23 shows a perspective view of a boom section.
Figure 24:
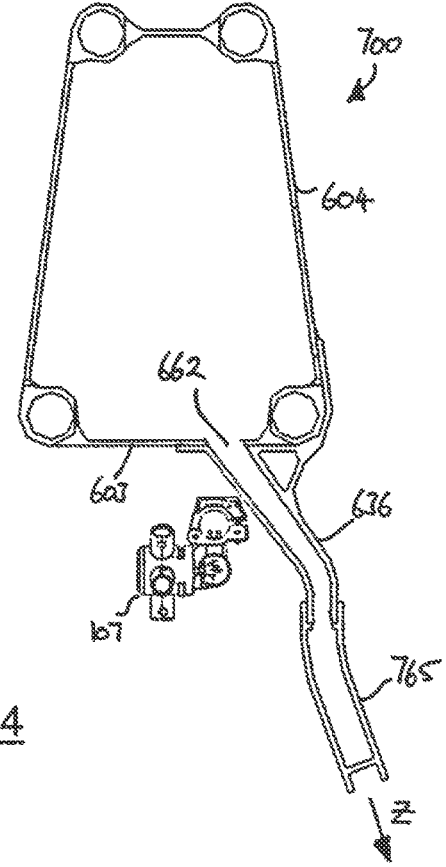
FIG. 24 shows a vertical section taken through the boom of FIG. 23.

FIGS. 23 and 24 illustrate an alternative construction to boom 600 described above. Boom 700 comprises only a front windshield 636 of dual skin construction and also includes a lower baffle plate 765. Pressurized air within the HSS frame 601 is conveyed, via vents 662, into the cavity of the dual skin front windshields 636 and then into dual skin baffle plate 765. In a similar manner in that described in relation to FIG. 21, the lower edge of baffle plate 765 comprises a plurality of holes (not shown) which serve as air dispensing nozzles to dispense a curtain of pressurized air that is directed into the standing crop below. The baffle plate 765 is angled forwardly to direct the pressurized air curtain forwardly and thus open the crop canopy ahead of the applied liquid.

Figure 22:
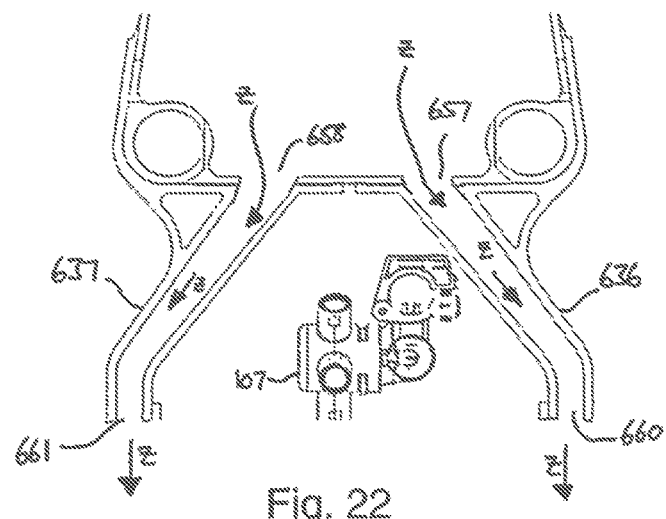
FIG. 22 shows a vertical section taken through the boom of FIG. 21.

Boom 800 shown in FIGS. 25 and 26 has been described above in relation to the drip tray functionality. The construction and functionally it similar to that illustrated in FIGS. 21 and 22 but with the addition of the double-skin drip tray 842 which can flex between an open position (FIG. 25) and closed position (FIG. 26). The rear windshield 637 may convey a pressurized air curtain as illustrated in FIG. 22 or may be, simply, a passive structure serving as a windshield only.

Furthermore, the double-skin drip tray 843 may comprise nozzles integrated along the longitudinal edge. The cavity provided by the double-skin structure can be used to convey pressurized air from the front windshield 636 to the nozzles which vent a pressurized air curtain into the standing crop canopy.

Boom 900 illustrated in FIGS. 27 to 29, and described above in relation to the drip tray functionality, comprises a front double-skin baffle 942 and rear double-skin baffle 946 each having a flexible portion that permits the baffles to flex between the different positions illustrated. In FIG. 27, for example, a pressurized air curtain may be vented by each of the double-skin baffles 943, 946 to open up the crop canopy either side of a strip directly beneath the nozzles 107. The flexible nature of the double-skin baffles 943, 946 allows the dispensed air curtain to be angled inwardly as shown in FIG. 28.

The invention claimed is:

1. A boom for mounting to an agricultural sprayer, the boom comprising:

an elongate frame having an elongate axis extending substantially perpendicular to a normal forward direction of travel and supporting a plurality of liquid application devices;

at least one pipe connecting the plurality of liquid application devices to a liquid storage tank; and an elongate tray attached to the elongate frame and extending substantially along an entire length of the elongate frame, the elongate tray spaced apart from the plurality of liquid application devices, wherein the elongate tray comprises: a first longitudinal edge proximate a forward side of the elongate frame and comprising a pivot axis parallel to the elongate axis of the elongate frame; and a second longitudinal edge opposite the first longitudinal edge;

wherein the elongate tray is pivotally mounted to the elongate frame for movement about the pivot axis so as to pivot between a first position in which the second longitudinal edge is proximate a rearward side of the elongate frame such that the elongate tray extends substantially horizontally beneath the plurality of liquid application devices and forms a liquid-retaining receptacle to prevent liquid from leaking from the plurality of liquid application devices onto the ground below, and a second position in which the second longitudinal edge is located forward of and clear of delivery paths of the plurality of liquid application devices and the elongate tray extends downward to impact upon an airflow incident thereon as the sprayer moves across a field.

2. The boom of claim 1, wherein the elongate frame comprises a first longitudinal member relative to the elongate axis of the elongate frame, and wherein the elongate tray is pivotally mounted to the first longitudinal member.

3. The boom of claim 1, further comprising a latch configured to secure the second longitudinal edge to the elongate frame when the elongate tray is in the second position.

4. The boom of claim 1, wherein the pivot axis is disposed below the plurality of liquid application devices.

5. The boom of claim 1, wherein the elongate tray comprises a first tray pivotally mounted to a front edge of the elongate frame and a second tray pivotally mounted to a rear edge of the elongate frame, wherein each of the first and second trays are pivotally movable between a first position in which the first and second trays extend substantially horizontally beneath the plurality of liquid application devices, and a second position in which the first and second trays are located clear of delivery paths of the plurality of liquid application devices.

6. The boom of claim 5, wherein the first and second trays overlap when both are in their respective first positions.

7. The boom of claim 5, wherein respective longitudinal edges of the first and second trays meet along a sealed seam below the plurality of liquid application devices when both trays are in their respective first positions.

8. The boom of claim 1, wherein the elongate tray comprises a double-skin structure.

9. The boom of claim 8, wherein the elongate tray defines at least one inlet and at least one vent, wherein the at least one inlet is in communication with a source of pressurized air when the elongate tray is in the second position.

10. The boom of claim 9, wherein the double-skin structure defines a passage for the pressurized air between the at least one inlet and the at least one vent.

11. The boom of claim 1, wherein the elongate tray is substantially rectangular in shape.

12. The boom of claim 1, wherein the elongate tray exhibits a concave profile for collecting liquid.

13. The boom of claim 1, wherein the elongate tray comprises a lip around its periphery.

14. The boom of claim 1, wherein the elongate tray comprises a plastic material.

15. The boom of claim 1, wherein the elongate frame comprises a hollow structural section member under which the plurality of liquid application devices and the at least one pipe are mounted.

16. An agricultural sprayer comprising a boom, the boom comprising:
- an elongate frame having an elongate axis extending substantially perpendicular to a normal forward direction of travel and supporting a plurality of liquid application devices;
- at least one pipe connecting the plurality of liquid application devices to a liquid storage tank; and
- an elongate tray attached to the elongate frame and extending substantially along an entire length of the elongate frame, the elongate tray spaced apart from the plurality of liquid application devices, wherein the elongate tray comprises: a first longitudinal edge proximate a forward side of the elongate frame and comprising a pivot axis parallel to the elongate axis of the elongate frame; and
- a second longitudinal edge opposite the first longitudinal edge;
- wherein the elongate tray is pivotally mounted to the elongate frame for movement about the pivot axis so as to pivot between a first position in which the second longitudinal edge is proximate a rearward side of the elongate frame such that the elongate tray extends substantially horizontally beneath the plurality of liquid application devices and forms a liquid-retaining receptacle to prevent liquid from leaking from the plurality of liquid application devices onto the ground below, and a second position in which the second longitudinal edge is located forward of and clear of delivery paths of the plurality of liquid application devices and the elongate tray extends downward to impact upon an airflow incident thereon as the sprayer moves across a field.

17. The agricultural sprayer of claim 16, wherein the elongate tray in the second position extends forwardly of the elongate frame with respect to the normal forward direction of travel of the agricultural sprayer.

18. The agricultural sprayer of claim 16, further comprising a first baffle located behind and above the plurality of liquid application devices with respect to the normal forward direction of travel of the agricultural sprayer, and a second baffle extending forwardly of the elongate frame and configured to funnel an airflow created by movement of the agricultural sprayer into an open section in a front side of the boom, the airflow being deflected downwardly by the first baffle.

19. The agricultural sprayer of claim 18, wherein second baffle comprises the elongate tray.

20. The agricultural sprayer of claim 18, wherein the second baffle further comprises an upper baffle plate extending along the front side of the boom and being mounted along one edge to the elongate frame above the open section and extending upwardly and forwardly, to guide a further portion of the airflow into the front side of the elongate frame.

* * * * *